United States Patent
Fujimura et al.

(10) Patent No.: US 10,409,292 B2
(45) Date of Patent: Sep. 10, 2019

(54) MOVEMENT CONTROL METHOD, AUTONOMOUS MOBILE ROBOT, AND RECORDING MEDIUM STORING PROGRAM

(71) Applicant: Panasonic Intellectual Property Corporation of America, Torrance, CA (US)

(72) Inventors: Ryota Fujimura, Kanagawa (JP); Kazuki Funase, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 245 days.

(21) Appl. No.: 15/370,070

(22) Filed: Dec. 6, 2016

(65) Prior Publication Data
US 2017/0166299 A1 Jun. 15, 2017

(30) Foreign Application Priority Data

Dec. 10, 2015 (JP) .................................. 2015-241142
Jul. 22, 2016 (JP) .................................. 2016-144363

(51) Int. Cl.
*G05D 1/10* (2006.01)
*B64C 39/02* (2006.01)
*G08G 5/00* (2006.01)

(52) U.S. Cl.
CPC .......... *G05D 1/101* (2013.01); *B64C 39/024* (2013.01); *G05D 1/106* (2019.05); *G08G 5/006* (2013.01); *B64C 2201/145* (2013.01); *Y10S 901/01* (2013.01)

(58) Field of Classification Search
None
See application file for complete search history.

(56) References Cited

U.S. PATENT DOCUMENTS

| 2008/0269973 | A1* | 10/2008 | Kuroda | G05D 1/0214 701/26 |
| 2012/0197439 | A1* | 8/2012 | Wang | B25J 9/1689 700/259 |
| 2015/0088310 | A1* | 3/2015 | Pinter | G06Q 50/22 700/253 |

(Continued)

FOREIGN PATENT DOCUMENTS

| JP | 2014-119828 | | 6/2014 |
| JP | 2014119901 A | * | 6/2014 |

OTHER PUBLICATIONS

Machine Translation of JP-2014119901-A (Year: 2014).*

*Primary Examiner* — Navid Ziaeianmehdizadeh
(74) *Attorney, Agent, or Firm* — Greenblum & Bernstein, P.L.C.

(57) ABSTRACT

A method for controlling the movement of an autonomous mobile robot includes acquiring information regarding a person present around the autonomous mobile robot, calculating a visible range in which the autonomous mobile robot is visible to the eyes of the person on the basis of the acquired information regarding the person, and determining a movement range in which the autonomous mobile robot is movable on the basis of the calculated visible range, and causing the autonomous mobile robot to move within the determined movement range.

20 Claims, 12 Drawing Sheets

(56) References Cited

U.S. PATENT DOCUMENTS

| | | | |
|---|---|---|---|
| 2015/0323930 A1* | 11/2015 | Downey | G08G 5/006 |
| | | | 701/2 |
| 2015/0350614 A1* | 12/2015 | Meier | H04N 7/188 |
| | | | 348/144 |
| 2016/0150192 A1* | 5/2016 | Cheatham, III | G06K 9/00 |
| | | | 348/143 |
| 2016/0173742 A1* | 6/2016 | Hassan Zureikat | H04N 5/2252 |
| | | | 348/144 |
| 2016/0306351 A1* | 10/2016 | Fisher | H04W 4/70 |
| 2017/0069214 A1* | 3/2017 | Dupray | G08G 5/0021 |
| 2017/0178518 A1* | 6/2017 | Foladare | G08G 5/0034 |
| 2018/0026705 A1* | 1/2018 | Parks | G08C 17/02 |
| | | | 701/2 |
| 2018/0086433 A1* | 3/2018 | Ichihara | B64C 13/20 |
| 2018/0194455 A1* | 7/2018 | Park | H04W 4/02 |

\* cited by examiner

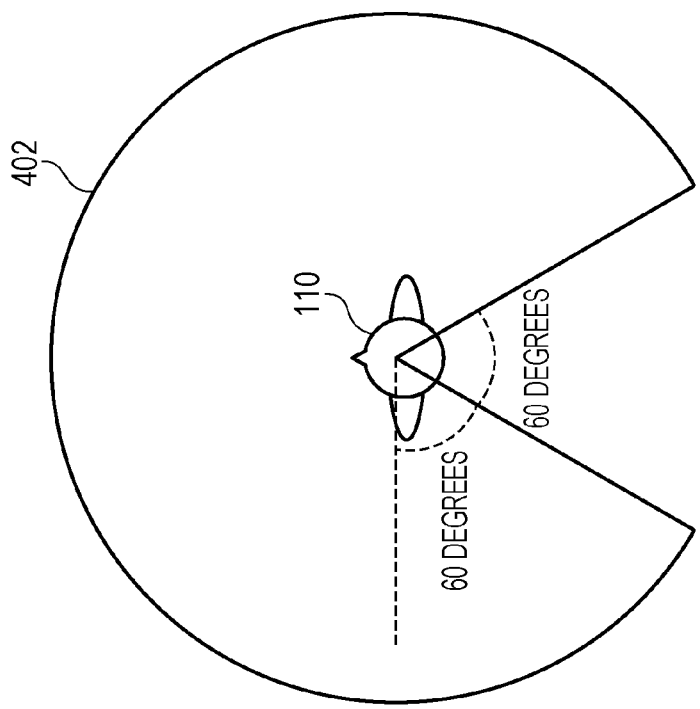
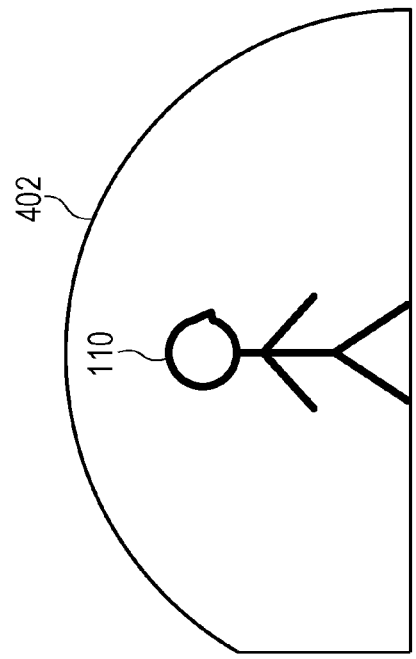

MOVEMENT CONTROL METHOD, AUTONOMOUS MOBILE ROBOT, AND RECORDING MEDIUM STORING PROGRAM

BACKGROUND

1. Technical Field

The present disclosure relates to a movement control method for controlling the movement of an autonomous mobile robot, an autonomous mobile robot that autonomously moves, and recording medium storing a computer-readable program for controlling the movement of an autonomous mobile robot.

2. Description of the Related Art

In recent years, small autonomous aerial robots that autonomously fly along a predetermined path have been developed. The autonomous aerial robots include a plurality of propellers. By controlling the rotational speed of each of the propellers, the autonomous aerial robots can freely fly in the air and autonomously moves along a predetermined flight path.

For example, Japanese Unexamined Patent Application Publication No. 2014-119828 describes an autonomous aerial robot that flies to follow a moving object with a predetermined distance therebetween and captures the images of the moving object.

SUMMARY

In one general aspect, the techniques disclosed here feature a movement control method for controlling the movement of an autonomous aerial robot. The movement control method includes acquiring information regarding a person present around the autonomous mobile robot, calculating a visible range in which the autonomous mobile robot is visible to the eyes of the person on the basis of the acquired information regarding the person, and determining a movement range in which the autonomous mobile robot is movable on the basis of the calculated visible range, and causing the autonomous mobile robot to move within the determined movement range.

According to the present disclosure, the movement range in which an autonomous mobile robot is movable is determined on the basis of the visible range in which the autonomous mobile robot is visible to the eyes of a person present around the autonomous mobile robot. Thus, by causing the autonomous mobile robot to move within the visible range in which the autonomous mobile robot is visible to the eyes of a person present around the autonomous mobile robot, the person can monitor the autonomous mobile robot at all times. Alternatively, by causing the autonomous mobile robot to move outside the visible range in which the autonomous mobile robot is visible to a person present around the autonomous mobile robot, the autonomous mobile robot can be moved without being seen by the person.

It should be noted that general or specific embodiments may be implemented as a system, an apparatus, an integrated circuit, a computer program, or a computer-readable recording medium, such as a CD-ROM, or any selective combination of a system, a method, an apparatus, an integrated circuit, a computer program, and a computer-readable recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 8A and 8B illustrate an example of a second visible range according to the modification of the first exemplary embodiment;

DETAILED DESCRIPTION

Figure 1:
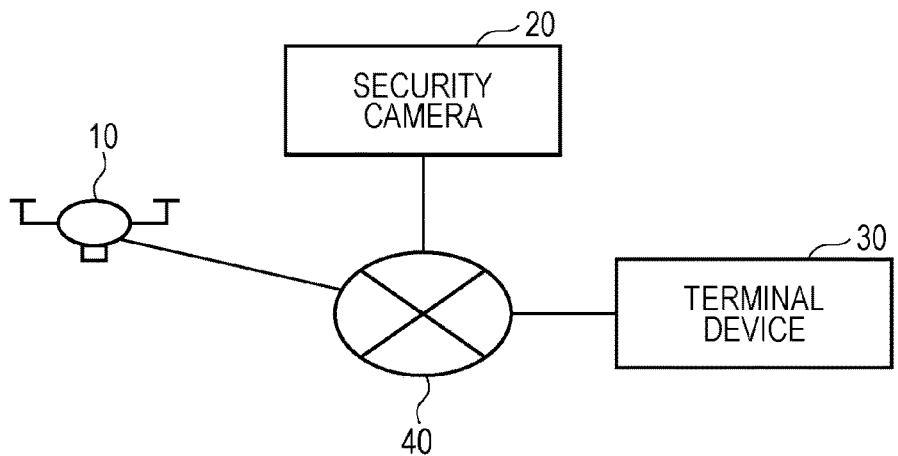
FIG. 1 illustrates the configuration of a flight control system according to a first exemplary embodiment of the present disclosure.

Underlying Knowledge Forming Basis of the Present Disclosure

As described above, the existing autonomous aerial robot described in Japanese Unexamined Patent Application Publication No. 2014-119828 flies to follow a moving object, such as a human, with a predetermined distance therebetween. Accordingly, the autonomous aerial robot comes into human view, which may be annoying to the human.

In addition, Japanese Unexamined Patent Application Publication No. 2014-119828 does not describe the case where the autonomous aerial robot moves within view of the human. Accordingly, when the autonomous aerial robot moves out of sight of the human, the human may not monitor the autonomous aerial robot. That is, according to the existing autonomous aerial robot described in Japanese Unexamined Patent Application Publication No. 2014-119828, it is difficult to set practically required limitations on the movement of the autonomous aerial robot.

The present disclosure provides a movement control method, an autonomous mobile robot, and a recording medium storing a program that allow a person present around the autonomous mobile robot to monitor the autonomous mobile robot at all times by causing the autonomous mobile robot to move within the visible range in which the autonomous mobile robot is visible to the eyes of the person or allow the autonomous mobile robot to move without being seen by the person by causing the autonomous mobile robot to move outside the visible range in which the autonomous mobile robot is visible to the eyes of the person.

According to an aspect of the present disclosure, a method for controlling the movement of an autonomous mobile robot includes acquiring information regarding a person present around the autonomous mobile robot, calculating a visible range in which the autonomous mobile robot is visible to the eyes of the person on the basis of the acquired information regarding the person, and determining a movement range in which the autonomous mobile robot is movable on the basis of the calculated visible range, and causing the autonomous mobile robot to move within the determined movement range.

According to such a configuration, the information regarding a person present around the autonomous mobile robot is acquired. The visible range of the person is calculated on the basis of the acquired information regarding the person, and the movement range in which the autonomous mobile robot is movable is determined on the basis of the calculated visible range.

Since the movement range in which the autonomous mobile robot is movable is determined on the basis of the visible range of the person present around the autonomous mobile robot, the person can monitor the autonomous mobile robot at all times by causing the autonomous mobile robot to move within the visible range of the person. Alternatively, the autonomous mobile robot can be moved without being seen by the person present around the autonomous mobile robot by causing the autonomous mobile robot to move outside the visible range of the person.

In the above-described movement control method, a movement path along which the autonomous mobile robot moves may be generated within the determined movement range.

According to such a configuration, since a movement path along which the autonomous mobile robot moves is generated within the movement range, the autonomous mobile robot can be controlled to move along the movement path.

In addition, in the above-described movement control method, identification information for identifying a predetermined person may be registered in advance. Thereafter, it may be determined whether the person present around the autonomous mobile robot is the predetermined person on the basis of the registered identification information, and it may be determined that the inside of the visible range of the predetermined person present around the autonomous mobile robot is the movement range if it is determined that the person present around the autonomous mobile robot is the predetermined person.

According to such a configuration, the identification information for identifying a predetermined person is registered in advance. It is determined whether the person present around the autonomous mobile robot is the predetermined person on the basis of the registered identification information. If it is determined that the person present around the autonomous mobile robot is the predetermined person, it is determined that the inside of the visible range of the predetermined person present around the autonomous mobile robot is the movement range.

Since it is determined that the inside of the visible range of the predetermined person present around the autonomous mobile robot is the movement range, the predetermined person can monitor the autonomous mobile robot that moves within the visible range at all times.

In addition, in the above-described movement control method, the identification information may be a face image of the predetermined person. According to such a configuration, by authenticating the face image of the predetermined person, it can be easily determined whether the person present around the autonomous mobile robot is the predetermined person.

In addition, in the above-described movement control method, the identification information may be sent from a communication device carried by the predetermined person.

According to such a configuration, since the identification information is sent from the communication device carried by the predetermined person, it can be determined whether the person present around the autonomous mobile robot is the predetermined person through a simplified authentication process.

In addition, in the above-described movement control method, it may be determined that the outside of the visible range of the predetermined person present around the autonomous mobile robot is the movement range.

According to such a configuration, it is determined that the outside of the visible range of the predetermined person present around the autonomous mobile robot is the movement range. Thus, by causing the autonomous mobile robot to move outside the visible range of the person present around the autonomous mobile robot, the autonomous mobile robot can be moved without being seen by the person.

In addition, in the above-described movement control method, the information regarding the person present around the autonomous mobile robot may include at least one of the position of the person, a direction of the body of the person, a direction of the face of the person, and a direction of a line of sight of the person.

According to such a configuration, the information regarding the person present around the autonomous mobile robot includes at least one of the position of the person, a direction of the body of the person, a direction of the face of the person, and a direction of a line of sight of the person. Accordingly, the visible range of the person can be calculated in accordance with at least one of the position of the person, the direction of the body of the person, the direction of the face of the person, and the direction of a line of sight of the person.

In addition, in the above-described movement control method, the visible range may be a region in a two-dimensional plane determined in accordance with at least one of the position of the person, the direction of a body of the person, the direction of a face of the person, and the direction of a line of sight of the person.

According to such a configuration, since the visible range is a region in a two-dimensional plane determined in accordance with at least one of the position of the person, the direction of a body of the person, the direction of a face of the person, and the direction of a line of sight of the person, the processing load required for calculating the visible range can be reduced.

In addition, in the above-described movement control method, the visible range may have different cost values each determined in accordance with the information regarding the person, and the autonomous mobile robot may superimpose the visible range on a map including a start point and a destination point of the autonomous mobile robot and generate the movement path using an optimization algorithm.

According to such a configuration, the visible range has different cost values each determined in accordance with the information regarding the person. The visible range is superimposed on a map including a start point and a destination point of the autonomous mobile robot, and the movement path is generated using an optimization algorithm.

Consequently, by using the optimization algorithm, the movement path can be easily generated on the basis of a map having a visible range superimposed thereon, where the visible range has different cost values each determined in accordance with the information regarding the person.

In addition, in the above-described movement control method, the visible range may include a first range formed in immediately front of the person, a second range formed in immediately back of a body of the person, and a third range formed on an outer side of the first range and the second range. The visible range may be superimposed on a map including the start point and the destination point of the autonomous mobile robot, and the map may be divided into a grid of squares so that each of the start point and the destination point coincides with an intersection point of sides of a square. Among all the sides of the squares, a cost value having a first value is assigned to each of the sides at least part of which is located in the first range, a cost value having a second value that is less than the first value is assigned to each of the sides part of which is located in the second range and the remaining part of which is not located in the first range or each of the sides the entirety of which is located in the second range, a cost value having a third value that is less than the second value is assigned to each of the sides part of which is located in the third range and the remaining part of which is not located in the first range and the second range or each of the sides the entirety of which is located in the third range, and a cost value having a fourth value that is less than the third value is assigned to each of the sides the entirety of which is located in none of the first range, the second range, and the third range. A movement path may be generated by selecting, from among all the paths that start from the start point and end at the destination point via the sides of the squares, the path having the lowest total cost and the shortest distance between the start point and the destination point.

According to such a configuration, the visible range includes a first range formed in immediately front of the person, a second range formed in immediately back of a body of the person, and a third range formed on an outer side of the first range and the second range. The visible range is superimposed on a map including the start point and the destination point of the autonomous mobile robot, and the map is divided into a grid of squares so that each of the start point and the destination point coincides with an intersection point of sides of a square. Among all the sides of the squares, a cost value having a first value is assigned to each of the sides at least part of which is located in the first range, a cost value having a second value that is less than the first value is assigned to each of the sides part of which is located in the second range and the remaining part of which is not located in the first range or each of the sides the entirety of which is located in the second range, a cost value having a third value that is less than the second value is assigned to each of the sides part of which is located in the third range and the remaining part of which is not located in the first range and the second range or each of the sides the entirety of which is located in the third range, and a cost value having a fourth value that is less than the third value is assigned to each of the sides the entirety of which is located in none of the first range, the second range, and the third range. A movement path is generated by selecting, from among all the paths that start from the start point and end at the destination point via the sides of the squares, the path having the lowest total cost and the shortest distance between the start point and the destination point.

Consequently, the movement path can be easily generated using the cost values each assigned in accordance with the distance between the side and the person present around the autonomous mobile robot.

In addition, in the above-described movement control method, the autonomous mobile robot may include an image capturer that acquires the image of an area around the autonomous mobile robot, and the information regarding the person may be acquired from the image information acquired by the image capturer.

According to such a configuration, since the information regarding the person present around the autonomous mobile robot is acquired from the image information acquired by the image capturer provided in the autonomous mobile robot, the information regarding the person who is actually visible to the autonomous mobile robot can be acquired.

Alternatively, in the above-described movement control method, the information regarding the person may be acquired from the image information acquired by an image capturing unit installed around the autonomous mobile robot.

According to such a configuration, the information regarding the person present around the autonomous mobile robot can be acquired from the image information acquired by the image capturer installed around the autonomous mobile robot.

Alternatively, in the above-described movement control method, the information regarding the person may be the current position of the person acquired by a position sensor carried by the person.

According to such a configuration, the current position of the person acquired by a position sensor carried by the person can be used as the information regarding the person.

Alternatively, in the above-described movement control method, the information regarding the person may be a direction in which the person faces acquired by a geomagnetic sensor carried by the person.

According to such a configuration, the direction in which the person faces acquired by a geomagnetic sensor carried by the person can be used as the information regarding the person.

Alternatively, in the above-described movement control method, the information regarding the person may be acquired from information regarding an image around a second autonomous mobile robot other than the autonomous mobile robot, and the image information may be acquired by an image capturer provided in the second autonomous mobile robot.

According to such a configuration, the information regarding the person present around an autonomous mobile robot can be acquired from information regarding an image around a second autonomous mobile robot other than the autonomous mobile robot, where the image information is acquired by an image capturer provided in the second autonomous mobile robot.

In addition, in the above-described movement control method, information regarding an obstacle present around the autonomous mobile robot may be acquired, and the movement range may be determined on the basis of the acquired information regarding the obstacle and the calculated visible range.

According to such a configuration, information regarding an obstacle present around the autonomous mobile robot is acquired, and the movement range is determined on the basis of the acquired information regarding the obstacle and the calculated visible range. Accordingly, the movement range can be determined while taking into account an area that is out of the line of sight of the person due to the obstacle.

In addition, in the above-described movement control method, the autonomous mobile robot may be an autonomous aerial robot. The altitude at which the autonomous aerial robot flies may be acquired, and the movement range may be determined only when the acquired altitude is lower than a predetermined altitude.

According to such a configuration, the autonomous mobile robot is an autonomous aerial robot. The altitude at which the autonomous aerial robot flies is acquired, and the movement range is determined only when the acquired altitude is lower than a predetermined altitude.

As described above, the movement range is determined only when the altitude at which the autonomous aerial robot flies is lower than a predetermined altitude. That is, the movement range can be determined when the autonomous aerial robot flies at low altitude at which the autonomous aerial robot is easily seen by the person. In contrast, when the autonomous aerial robot flies at high altitude at which the autonomous aerial robot is rarely seen by the person, the autonomous aerial robot can fly from the current position to the destination point without determining any movement range so as to take the shortest way.

In addition, in the above-described movement control method, if the movement range is not determined, a current position of the autonomous mobile robot may be sent to a predetermined terminal device.

According to such a configuration, if the movement range is not determined, a current position of the autonomous mobile robot is sent to a predetermined terminal device. Accordingly, if the movement range is not determined, an input instructing how to move the autonomous mobile robot can be received.

In addition, in the above-described movement control method, if the length of the generated movement path is longer than a predetermined distance, the length of the generated movement path may be sent to a predetermined terminal device.

According to such a configuration, if the length of the generated movement path is longer than a predetermined distance, the length of the generated movement path is sent to a predetermined terminal device. Accordingly, if the length of the generated movement path is longer than the predetermined distance, a battery mounted in the autonomous mobile robot may not last the entire distance to the destination point. By sending the length of the generated movement path in advance, the battery can be prevented from fully discharging during the movement.

In addition, in the above-described movement control method, at least one of the acquisition of the information regarding the person, the calculation of the visible range, the determining of the movement range and the causing may be performed by a processor.

According to such a configuration, at least one of the acquisition of the information regarding the person, the calculation of the visible range, the determination of the movement range and the causing can be performed by a processor.

According to another aspect of the present disclosure, an autonomous mobile robot for performing autonomous movement is provided. The autonomous mobile robot includes a person information acquirer that acquires information regarding a person present around the autonomous mobile robot, a calculator that calculates a visible range in which the autonomous mobile robot is visible to the eyes of the person on the basis of the acquired information regarding the person, and a determinator that determines a movement range in which the autonomous mobile robot is movable on the basis of the calculated visible range and a controller that causes the autonomous mobile robot to move within the determined movement range.

According to such a configuration, the information regarding the person present around the autonomous mobile robot is acquired. Thereafter, the visible range of the person is calculated on the basis of the acquired information regarding the person, and the movement range in which the autonomous mobile robot is movable is determined.

Since the movement range in which the autonomous mobile robot is movable is determined on the basis of the visible range of the person present around the autonomous mobile robot, the person can monitor the autonomous mobile robot at all times by causing the autonomous mobile robot to move within the visible range of the person. Alternatively, by causing the autonomous mobile robot to move outside the visible range of the person present around the autonomous mobile robot, the autonomous mobile robot can move without being seen by the person.

In addition, in the above-described autonomous mobile robot, at least one of the person information acquirer, the calculator, and the determinator may include a processor.

According to such a configuration, at least one of acquisition of the information regarding the person, calculation of the visible range, and determination of the movement range can be performed by the processor.

According to still another aspect of the present disclosure, a non-transitory recording medium stores a computer-readable program that controls movement of an autonomous mobile robot by causing a computer to function as a person information acquirer that acquires information regarding a person who is located around the autonomous mobile robot, a calculator that calculates a visible range in which the autonomous mobile robot is visible to the eyes of the person on the basis of the acquired information regarding the person, and a determinator that determines a movement range in which the autonomous mobile robot is movable on the basis of the calculated visible range and a controller that causes the autonomous mobile robot to move within the determined movement range.

According to such a configuration, the information regarding the person present around the autonomous mobile robot is acquired. The visible range of the person is calculated on the basis of the acquired information regarding the person, and the movement range in which the autonomous mobile robot is movable is determined.

Since the movement range in which the autonomous mobile robot is movable is determined on the basis of the visible range of the person present around the autonomous mobile robot, the person can monitor the autonomous mobile robot at all times by causing the autonomous mobile robot to move within the visible range of the person. Alternatively, by causing the autonomous mobile robot to move outside the visible range of the person present around the autonomous mobile robot, the autonomous mobile robot can move without being seen by the person.

Exemplary embodiments of the present disclosure are described below with reference to the accompanying drawings. Note that the following exemplary embodiments are particular examples of the present disclosure and do not limit the technical scope of the present disclosure.

First Exemplary Embodiment

FIG. 1 illustrates the configuration of a flight control system according to the first exemplary embodiment of the present disclosure. As illustrated in FIG. 1, a flight control system includes an autonomous aerial robot 10, at least one security camera 20, and a terminal device 30. Note that the autonomous aerial robot 10 is an example of an autonomous mobile robot, and the security camera 20 is an example of an image capturer.

The autonomous aerial robot 10 autonomously flies from a predetermined start point to a predetermined destination point. If the start point and the destination point are input, the autonomous aerial robot 10 automatically generates a movement path from the start point to the destination point. The autonomous aerial robot 10 includes a plurality of propellers. By controlling the rotational speed of each of the propellers, the autonomous aerial robot 10 can move forward/backward, rightward/leftward, and upward/downward. The autonomous aerial robot 10 acquires the current position thereof using a global positioning system (GPS) and autonomously flies from the start point to the destination point. The autonomous aerial robot 10 are connected to the security camera 20 and the terminal device 30 via a network 40 so as to communicate with the security camera 20 and the terminal device 30. An example of the network 40 is the Internet or a mobile phone communication network.

The security camera 20 captures the image of a person who is present around the security camera 20 (a person in the vicinity) and sends the information regarding the captured image to the autonomous aerial robot 10. Note that instead of including a single security camera 20, the flight control system may include a plurality of security cameras 20. Furthermore, the flight control system need not necessarily include a security camera 20.

The terminal device 30 is used to set the start point and the destination point. Examples of the terminal device 30 include a smartphone, a tablet computer, and a personal computer. The terminal device 30 receives a start point and a destination point of the autonomous aerial robot 10 input thereto by a user and sends information indicating the received start point and destination point to the autonomous aerial robot 10. Note that the terminal device 30 may receive the departure time of the autonomous aerial robot 10 input thereto by the user and send, to the autonomous aerial robot 10, the information indicating the received departure time. In addition, in response to a request received from the autonomous aerial robot 10, the terminal device 30 may send environment information indicating a map of the area around the autonomous aerial robot 10.

Figure 2:
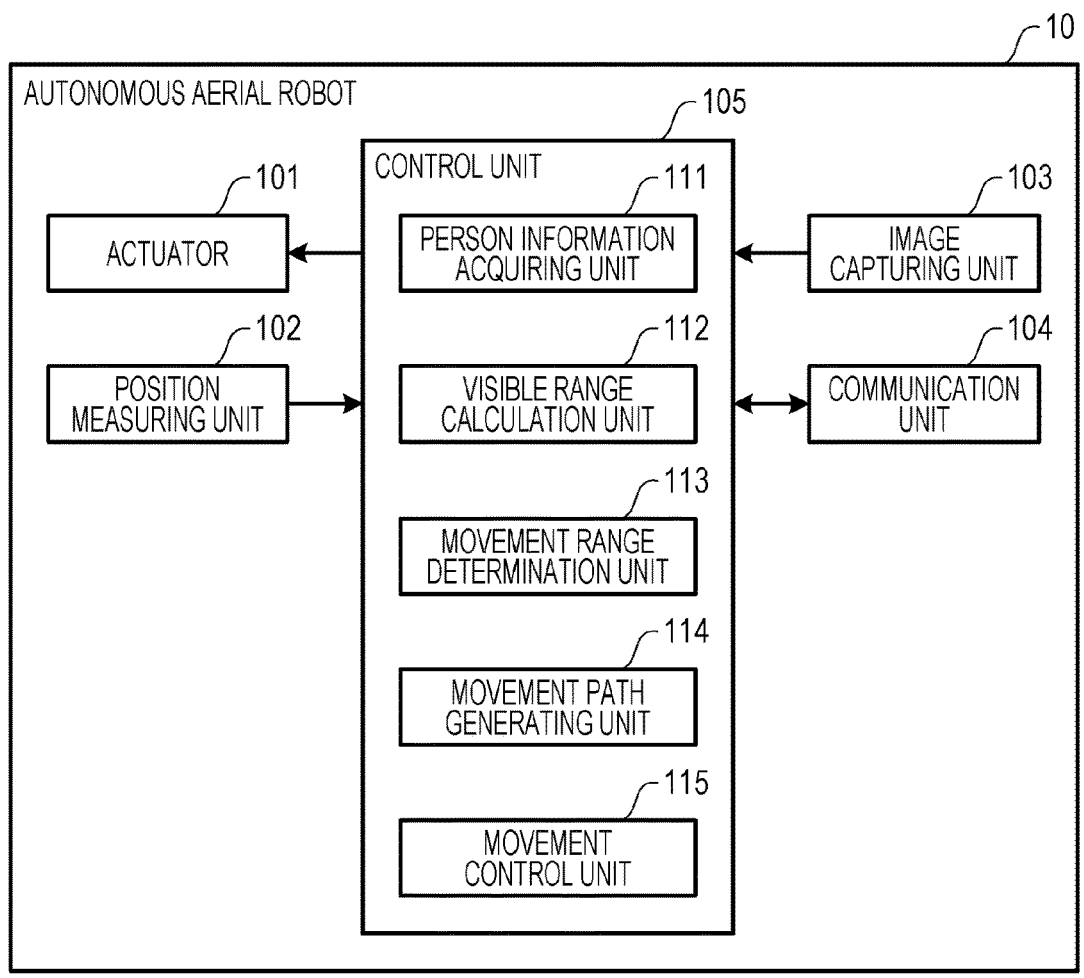
FIG. 2 is a block diagram of the configuration of an autonomous aerial robot according to the first exemplary embodiment of the present disclosure.

FIG. 2 is a block diagram of the configuration of the autonomous aerial robot according to the first exemplary embodiment of the present disclosure. As illustrated in FIG. 2, the autonomous aerial robot 10 includes an actuator 101, a position measuring unit 102, an image capturing unit 103, a communication unit 104, and a control unit 105.

The actuator 101 drives each of a plurality of propellers. The actuator 101 rotates the plurality of propellers to allow the autonomous aerial robot 10 to fly. In addition, the actuator 101 may control the number of revolutions per unit time of each of the plurality of propellers that allow the autonomous aerial robot 10 to fly, so that the direction of flight of the autonomous aerial robot 10 is controlled. Also, the autonomous aerial robot 10 may include an actuator (not illustrated) to change a direction of a wing in the autonomous aerial robot 10. A flying direction of the autonomous aerial robot 10 can be controlled by controlling the actuator that changes the direction of the wing.

An example of the position measuring unit 102 is a GPS. The position measuring unit 102 acquires the position information indicating the current position of the autonomous aerial robot 10. Note that the current position is expressed using the latitude, the longitude, and the altitude.

An example of the image capturing unit 103 is a camera and is, more preferably, an omnidirectional camera. The image capturing unit 103 captures the image of, for example, a person present around the autonomous aerial robot 10 and acquires the image information regarding the captured image.

The communication unit 104 receives the image information from the security camera 20 via the network 40. The communication unit may be formed using a communication circuit. In addition, the communication unit 104 receives, from the terminal device 30, the information indicating the start point and the destination point via the network 40. Furthermore, the communication unit 104 sends, to the terminal device 30, the position information acquired by the position measuring unit 102 and receives, from the terminal device 30, the environment information indicating a map around the position of the autonomous aerial robot 10 identified by the position information.

The control unit 105 includes a processor, such as a central processing unit (CPU), and controls the operation performed by the autonomous aerial robot 10. The control unit 105 is formed from a person information acquiring unit 111, a visible range calculation unit 112, a movement range determination unit 113, a movement path generating unit 114, and a movement control unit 115. The autonomous aerial robot 10 includes a memory (not illustrated), which stores a program that allows the control unit 105 to function. When the CPU executes the program, the control unit 105 functions. Alternatively, the control unit 105 may be formed using a dedicated circuit having the function of the control unit 105. The dedicated circuit may be, for example, an integrated circuit.

The person information acquiring unit 111 acquires the information regarding a person present around the autonomous aerial robot 10 on the basis of the image information acquired by the image capturing unit 103 and/or the image information received by the communication unit 104. The information regarding the person present around the autonomous aerial robot 10 includes at least one of the position of the person, the direction of the body of the person, the direction of the face of the person, and the direction of the line of sight of the person. The person information acquiring unit 111 performs an image recognition process on the image information and acquires at least one of the position of the person, the direction of the body of the person, the direction of the face of the person, and the direction of the line of sight of the person included in the image information. Note that each of the autonomous aerial robot 10 and the security camera 20 may include a range sensor that measures the distance of the person therefrom, and the person information acquiring unit 111 may acquire the information regarding the person present around the autonomous aerial robot 10 on the basis of the measured distance.

The visible range calculation unit 112 calculates a visible range in which the autonomous aerial robot 10 is visible to the eye of the person on the basis of the information regarding the person acquired by the person information acquiring unit 111. The visible range is an area in a two-dimensional plane determined in accordance with at least one of the position of the person, the direction of the body of the person, the direction of the face of the person, and the direction of the line of sight of the person.

The movement range determination unit 113 determines a movement range in which the autonomous aerial robot 10 is movable on the basis of the visible range calculated by the visible range calculation unit 112.

The movement path generating unit 114 generates a movement path along which the autonomous aerial robot 10 moves in the movement range determined by the movement range determination unit 113. The movement path generating unit 114 generates the movement path along which the autonomous aerial robot 10 moves in the movement range determined by the movement range determination unit 113 using, for example, an optimization algorithm, such as dynamic programming.

In addition, the movement path generating unit 114 may generate the movement path using an optimization algorithm by superimposing, on a map including the start point and the destination point of the autonomous aerial robot 10, a visible range having different cost values determined in accordance with the information regarding a person in the vicinity.

The control unit 105 controls the movement of the autonomous aerial robot 10 based on the movement range determined by the movement range determination unit 113. For example, the movement control unit 115 controls actuator 101 to cause the autonomous aerial robot 10 to move within the movement range determined by the movement range determination unit 113. In addition, the control unit 105 may control the number of revolutions per unit time of each of the plurality of propellers to control the direction of flight of the autonomous aerial robot 10. Also the control unit 105 may control the actuator (not illustrated) that changes the direction of the wing of the actuator that changes the direction of the wing. Also, for example, the movement control unit 115 controls the movement of the autonomous aerial robot 10 along the movement path generated by the movement path generating unit 114.

The flight control process of the autonomous aerial robot 10 according to the first exemplary embodiment is described below.

Figure 3:
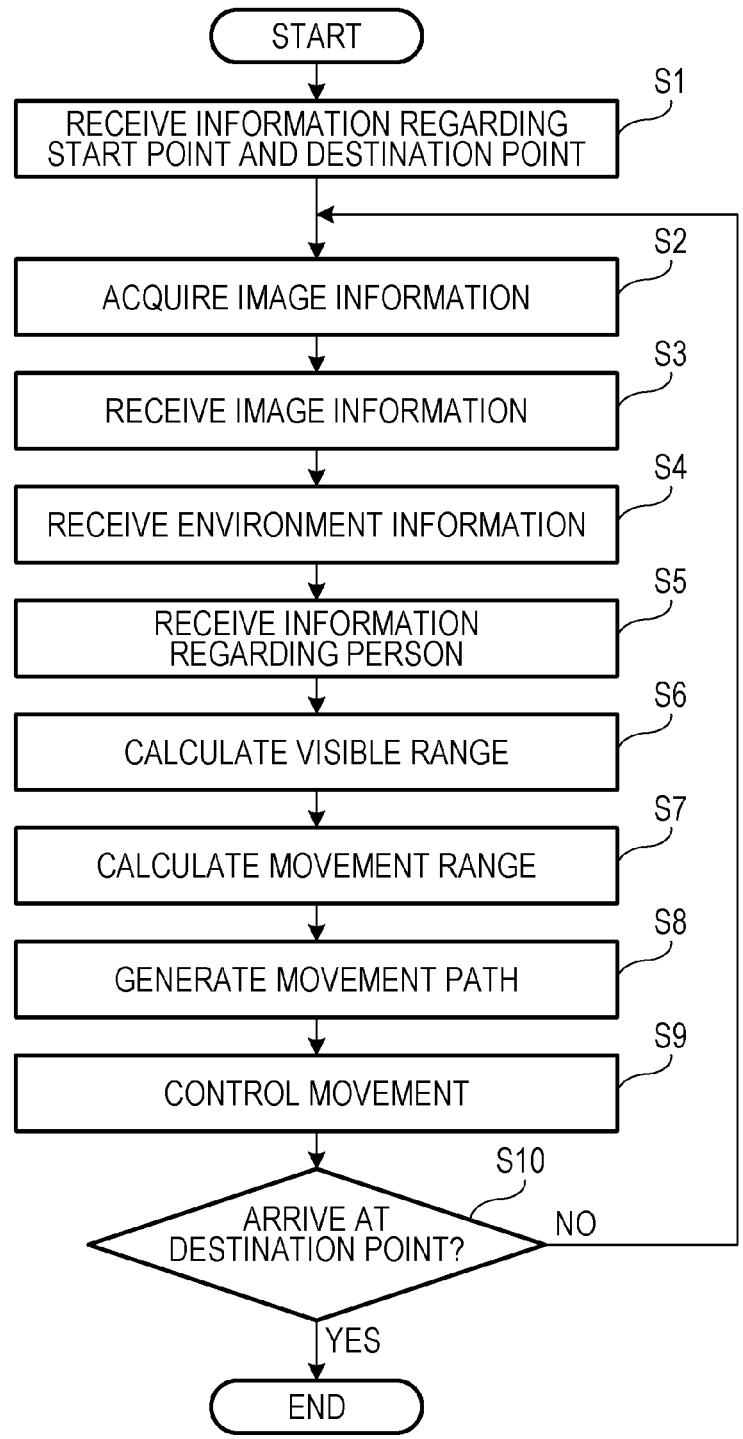
FIG. 3 is a flowchart of a flight control process of the autonomous aerial robot according to the first exemplary embodiment of the present disclosure.

FIG. 3 is a flowchart of the flight control process of the autonomous aerial robot according to the first exemplary embodiment of the present disclosure.

In step S1, the communication unit 104 receives, from the terminal device 30, the information regarding the start point and the destination point via the network 40 first. The terminal device 30 receives the information indicating the start point and the destination point input by the user and sends the received information indicating the start point and the destination point to the autonomous aerial robot 10. Note that the terminal device 30 need not receive the start point. In such a case, the start point may be defined as the current position of the autonomous aerial robot 10. In addition, the terminal device 30 may receive the departure time at which the autonomous aerial robot 10 is scheduled to start from the start point or the arrival time at which the autonomous aerial robot 10 is scheduled to arrive at the destination point and send the received departure time or arrival time to the autonomous aerial robot 10.

In step S2, the image capturing unit 103 acquires the image information regarding the captured image of the person present around the autonomous aerial robot 10. Note that in some cases, it is difficult to acquire the image information due to the position at which the image capturing unit 103 is mounted or the flight conditions of the autonomous aerial robot 10. That is, it may be difficult to acquire the image information when the autonomous aerial robot 10 having the image capturing unit 103 mounted in the lower portion thereof is about to land on the ground.

In step S3, the communication unit 104 receives the image information from the security camera 20 via the network 40. At that time, the communication unit 104 sends, to at least one of the security cameras 20 disposed between the start point and the destination point, an image request to acquire the image information. Upon receiving the image request, the security camera 20 sends, to the autonomous aerial robot 10, the image information regarding the captured image of the person present around the autonomous aerial robot 10. The communication unit 104 receives the image information sent from the security camera 20.

Note that the security camera 20 may send, to the autonomous aerial robot 10, the image information only when the image of a person is captured. If the image of a person is not captured, the security camera 20 need not send image information to the autonomous aerial robot 10. In addition, the security camera 20 may send the location information indicating the location of the security camera 20 together with the image information. Alternatively, instead of sending the image information, the security camera 20 may perform an image recognition process on the acquired image information and send the person information indicating at least one of the position of the person, the direction of the body of the person, the direction of the face of the person, and the direction of the line of sight of the person. Note that if the security camera 20 is not present around the autonomous aerial robot 10, there is a possibility that the autonomous aerial robot 10 does not acquire the image information from the security camera 20.

In step S4, the communication unit 104 receives, from the terminal device 30, the environment information indicating a map of the area around the autonomous aerial robot 10 via the network 40. At that time, the communication unit 104 may send, to the terminal device 30, the position information acquired by the position measuring unit 102 and receive, from the terminal device 30, the environment information indicating a map of the area around the autonomous aerial robot 10 identified by the position information. In addition, the communication unit 104 may receive, from the terminal device 30, the environment information indicating a map including the start point and the destination point. While the present exemplary embodiment has been described with reference to the communication unit 104 that receives the environment information from the terminal device 30, the present disclosure is not limited to such a process. The communication unit 104 may receive environment information from a server that provides maps. Note that the information regarding the environment around the autonomous aerial robot 10 may be the image information acquired by the image capturing unit 103 and/or the image information received by the communication unit 104.

In step S5, the person information acquiring unit 111 acquires the information regarding the person present around the autonomous aerial robot 10 on the basis of the image information acquired by the image capturing unit 103 and/or the image information received by the communication unit 104. At that time, the person information acquiring unit 111 performs an image recognition process on the image information and obtains information including at least one of the position of the person, the direction of the body of the person, the direction of the face of the person, and the direction of the line of sight of the person.

Note that while the present exemplary embodiment has been described with reference to the person information acquiring unit 111 that acquires the information regarding the person present around the autonomous aerial robot 10 on the basis of the image information, the present disclosure is not limited to such a process. The information regarding the person present around the autonomous aerial robot 10 may be acquired by a position sensor carried by the person. In such a case, the position sensor sends, to the autonomous aerial robot 10, the current position of the person present around the autonomous aerial robot 10. For example, a communication device carried by the person may include the position sensor. In addition, for example, the position sensor may have a communication function.

Alternatively, the information regarding the person present around the autonomous aerial robot 10 may be acquired by a geomagnetic sensor carried by the person. In such a case, the geomagnetic sensor sends, to the autonomous aerial robot 10, the direction in which the person present around the autonomous aerial robot 10 faces. For example, a communication device carried by the person may include the geomagnetic sensor. In addition, for example, the geomagnetic sensor may have a communication function. Alternatively, the information regarding the person present around the autonomous aerial robot 10 may be acquired from the image information acquired by an image capturing unit included in an autonomous aerial robot other than the autonomous aerial robot 10. That is, if another autonomous aerial robot is flying in the vicinity of the autonomous aerial robot 10, the autonomous aerial robot 10 may receive the image information regarding an image captured by the autonomous aerial robot other than the autonomous aerial robot 10 and acquire the information regarding the person present around the autonomous aerial robot 10 from the received image information.

In step S6, the visible range calculation unit 112 calculates a visible range in which the autonomous aerial robot 10 is visible to the eyes of the person on the basis of the person information acquired by the person information acquiring unit 111. The visible range according to the first exemplary embodiment is described below.

Figure 4:
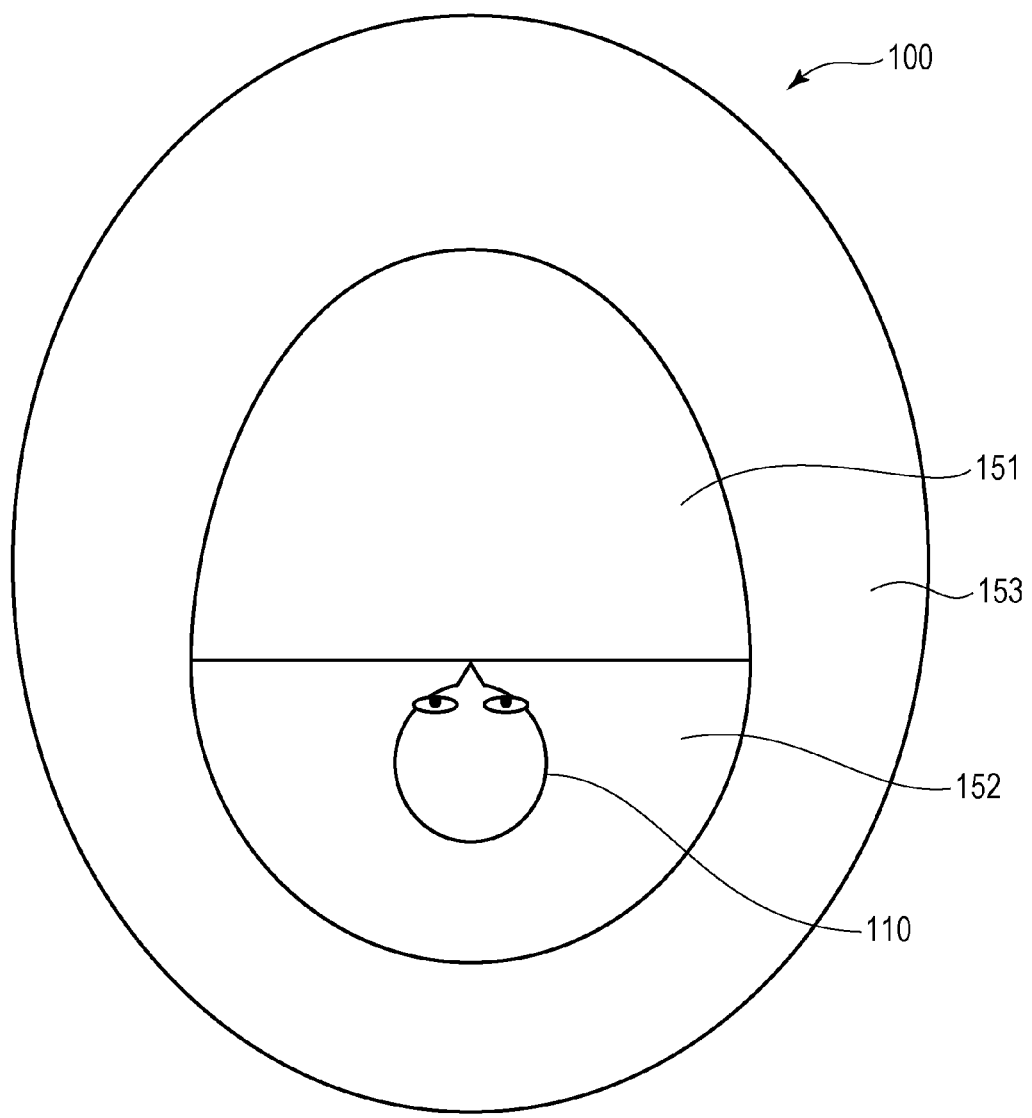
FIG. 4 illustrates an example of a visible range according to the first exemplary embodiment.

FIG. 4 illustrates an example of the visible range according to the first exemplary embodiment. As illustrated in FIG. 4, a visible range 100 includes a first range 151 formed in immediately front of the body of a person 110, a second range 152 formed on the back side of the body of the person 110 so as to be adjacent to the first range 151, and a third range 153 formed on the outer sides of the first range 151 and the second range 152 so as to be adjacent to the first range 151 and the second range 152. In an example illustrated in FIG. 4, the visible range calculation unit 112 calculates the visible range 100 in which the autonomous aerial robot 10 is visible to the eyes of the person on the basis of the direction of the body of the person.

Note that the visible range calculation unit 112 may calculate the visible range 100 in which the autonomous aerial robot 10 is visible to the eyes of the person on the basis of the direction of the face of the person. In such a case, the visible range 100 includes the first range 151 formed immediately before the face of the person 110, the second range 152 formed on the back of the face of the person 110 so as to be adjacent to the first range 151, and the third range 153 formed on the outer sides of the first range 151 and the second range 152 so as to be adjacent to the first range 151 and the second range 152.

Note that the shape of the visible range 100 is not limited to that illustrated in FIG. 4. For example, if only the current position of the person is acquired, the direction in which the person faces is indeterminable. Accordingly, the visible range calculation unit 112 may calculate, as the visible range 100, a circular range with a predetermined radius at the center of which there is the person.

Also note that the visible range calculation unit 112 calculates the visible range for each of all persons present around the autonomous aerial robot 10.

Referring back to FIG. 3, in step S7, the movement range determination unit 113 determines the movement range in which the autonomous aerial robot 10 is movable on the basis of the visible range calculated by the visible range calculation unit 112. According to the first exemplary embodiment, the movement range determination unit 113 determines, as the movement range, an area outside the visible range in which the autonomous aerial robot 10 is invisible to the person present around the autonomous aerial robot 10. That is, the movement range determination unit 113 determines, as the movement range in which the autonomous aerial robot 10 is movable, the area outside the visible range calculated by the visible range calculation unit 112.

In step S8, the movement path generating unit 114 generates a movement path along which the autonomous aerial robot 10 moves in the movement range determined by the movement range determination unit 113. A method for generating a movement path according to the first exemplary embodiment is described below.

Figure 5:
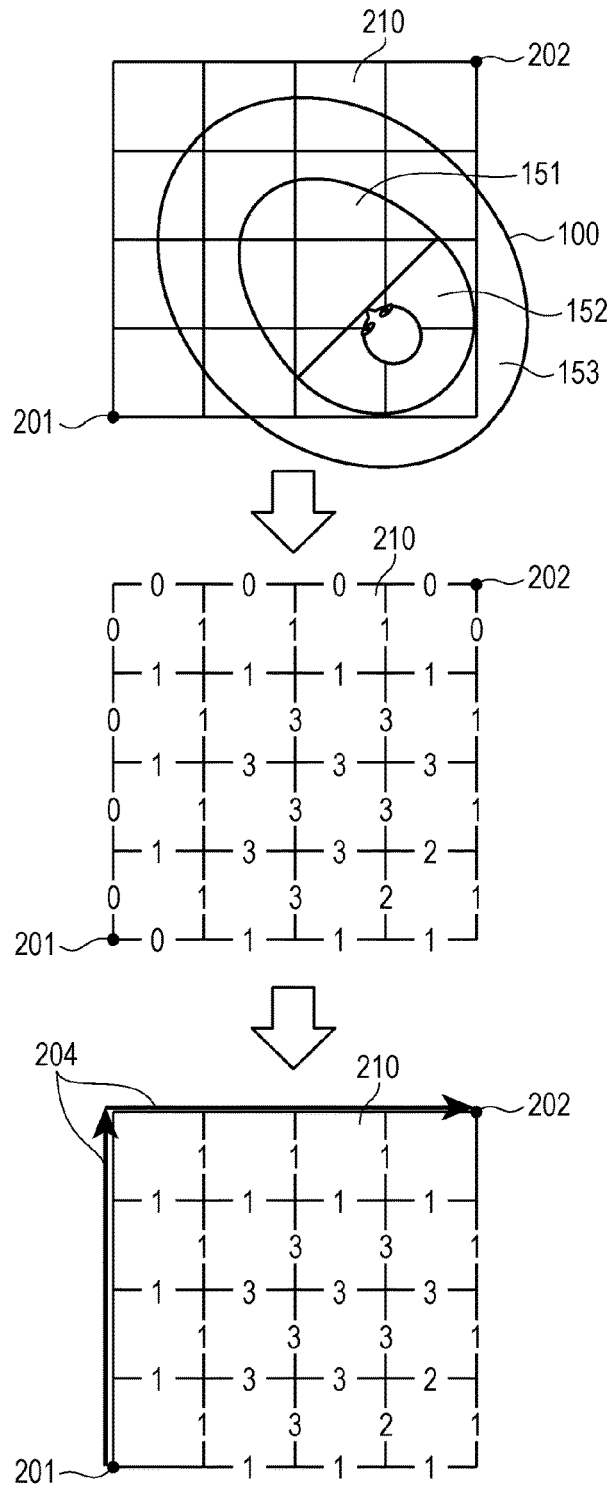
FIG. 5 is a schematic illustration of a method for generating a movement path according to the first exemplary embodiment.

FIG. 5 is a schematic illustration of a method for generating a movement path according to the first exemplary embodiment. As illustrated in FIG. 5, the movement path generating unit 114 superimposes the visible range 100 on a map 210 including a start point 201 and a destination point 202 of the autonomous aerial robot 10. Thereafter, the movement path generating unit 114 divides the map 210 into a grid of squares so that each of the start point and the destination point coincides with an intersection point of two sides of a square. Among all the sides of the squares, the movement path generating unit 114 assigns a cost value having a first value to each of the sides at least part of which is located in the first range 151. Among all the sides of the squares, the movement path generating unit 114 assigns a cost value having a second value that is less than the first value to each of the sides part of which is located in the second range 152 and the remaining part of which is not located in the first range 151 or each of the sides the entirety of which is located in the second range 152. Among all the sides of the squares, the movement path generating unit 114 assigns a cost value having a third value that is less than the second value to each of the sides part of which is located in the third range 153 and the remaining part of which is located in neither the first range 151 nor the second range 152 or each of the sides the entirety of which is located in the third range 153. Among all the sides of the squares, the movement path generating unit 114 assigns a fourth value that is less than the third value to each of the sides the entirety of which is located in none of the first range 151, the second range 152, and the third range 153. For example, the first value is set to "3", the second value is set to "2", the third value is set to "1", and the fourth value is set to "0".

The movement path generating unit 114 generates a movement path 204 by selecting, from among all the paths that start from the start point 201 and end at the destination point 202 via the sides of the squares, the path having the lowest total cost and the shortest distance between the start point 201 and the destination point 202. In FIG. 5, among all the paths that start from the start point 201 and end at the destination point 202 via the sides of the squares, the path having the lowest total cost "0" is generated as the movement path 204.

Referring back to FIG. 3, in step S9, the movement control unit 115 controls the movement of the autonomous aerial robot 10 in accordance with the movement path generated by the movement path generating unit 114. That is, the movement control unit 115 starts the flight of the autonomous aerial robot 10 so that the autonomous aerial robot 10 flies toward the destination point along the movement path generated by the movement path generating unit 114.

While the first exemplary embodiment has been described with reference to the autonomous aerial robot 10 that starts in response to generation of a movement path, the present disclosure is not limited to the timing. If the departure time is predetermined, the movement control unit 115 may cause the autonomous aerial robot 10 to wait until the departure time and start at the departure time. Alternatively, if the arrival time is predetermined, the movement control unit 115 may calculate the departure time by calculating the travel time on the basis of the movement path and the travel speed and subtracting the travel time from the arrival time.

In step S10, the movement control unit 115 determines whether the autonomous aerial robot 10 has arrived at the destination point. If it is determined that the autonomous aerial robot 10 has arrived at the destination point (YES in step S10), the flight control process is completed. However, if it is determined that the autonomous aerial robot 10 has not arrived at the destination point (NO in step S10), the processing returns to step S2. The processes in steps S2 to S10 are performed at predetermined timings. By decreasing the period of time from completion of the process in step S2 to start of the next process in step S2, the movement path of the autonomous aerial robot 10 that is invisible to the person can be more accurately generated.

Note that if an obstacle having a predetermined height is present around the person, the movement path generating unit 114 may generate the movement path while taking into account the obstacle.

Figure 6:
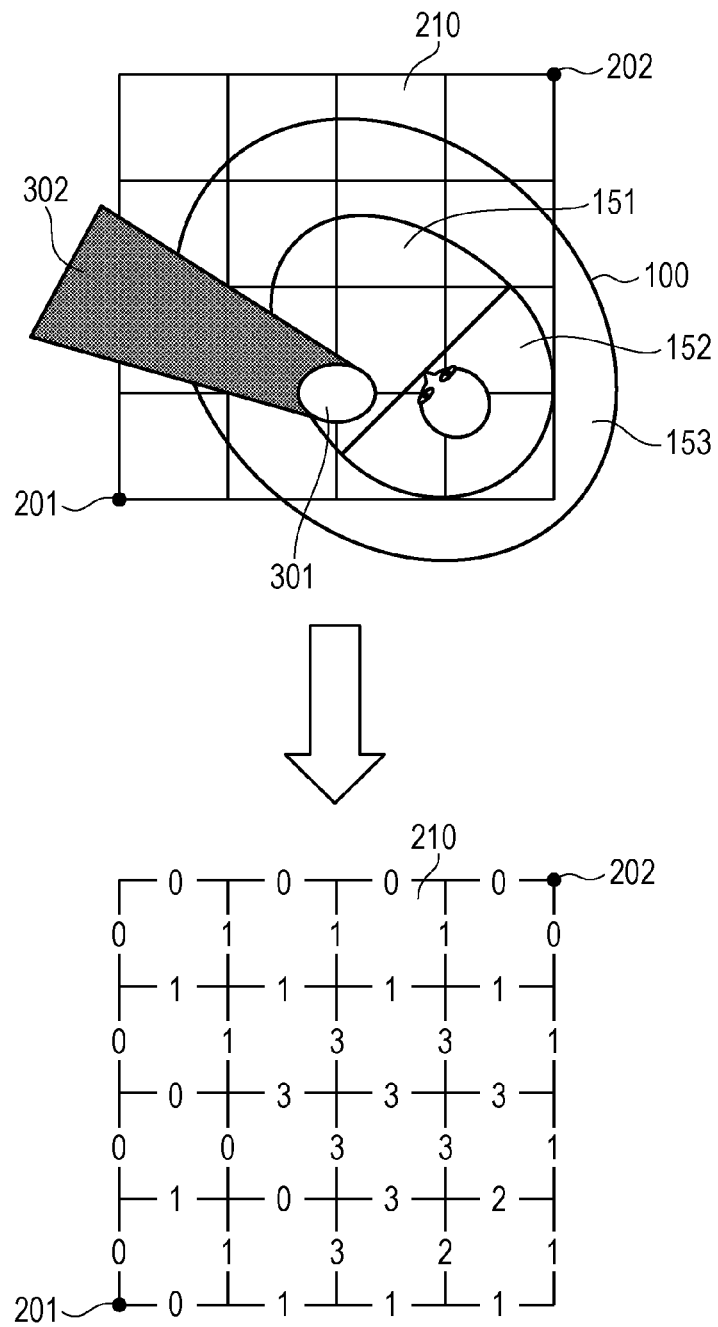
FIG. 6 is a schematic illustration of a method for generating a movement path while taking into account an obstacle according to the first exemplary embodiment.

FIG. 6 is a schematic illustration of a method for generating the movement path while taking into account an obstacle according to the first exemplary embodiment. The communication unit 104 may acquire the information regarding an obstacle present around the autonomous aerial robot 10. In addition, the movement range determination unit 113 may determine the movement range on the basis of the acquired information regarding an obstacle and the calculated visible range. If, as illustrated in FIG. 6, an obstacle 301 is diagonally to the left in front of the person, it is determined that a range 302 in the visible range 100 which is out of the line of sight of the person due to the obstacle 301 is the movement range.

In addition, as illustrated in FIG. 6, if the obstacle 301 is diagonally to the left in front of the person, the cost value of the range 302 in the visible range 100, which is out of the line of sight of the person due to the obstacle 301, is reduced. For example, among the sides of the squares generated through dividing into a grid pattern, the movement path generating unit 114 assigns the cost value having the fourth value to each of the sides at least part of which is located in the range 302, which is out of the line of sight of the person due to the obstacle 301. Note that the location of the obstacle 301 can be obtained from the environment information or the image information acquired by the image capturing unit 103 of the autonomous aerial robot 10. In addition, the range 302, which is out of the line of sight of the person, may be determined using at least one of the position of the person, the direction of the body of the person, the direction of the face of the person, and the direction of the line of sight of the person.

In addition, the current position acquired by the position measuring unit 102 may be expressed by including the altitude of the autonomous aerial robot 10 that is flying in addition to the latitude and the longitude of the position of the autonomous aerial robot 10. Only when the altitude acquired by the position measuring unit 102 is lower than a predetermined altitude, the movement range determination unit 113 may determine the movement range. If the altitude acquired by the position measuring unit 102 is the predetermined altitude or higher, the movable range determination unit 113 need not determine the movement range, and the movement path generating unit 114 may generate, as the movement path, the shortest path between the current position and the destination point. Note that the altitude may be measured by using an altimeter provided in the autonomous aerial robot 10.

In addition, if the movement range is not determined by the movement range determination unit 113, the communication unit 104 may send the current position of the autonomous aerial robot 10 to the terminal device 30. Note that the terminal device 30 is carried by an observer who monitors the autonomous aerial robot 10, a manager who manages the autonomous aerial robot 10, or an owner who owns the autonomous aerial robot 10. For example, if a plurality of persons are present around the autonomous aerial robot 10 and, therefore, an area outside the visible range is not present in the map, it is highly likely that the movement range determination unit 113 cannot determine the movement range. In such a case, the communication unit 104 sends the current position of the autonomous aerial robot 10 to the terminal device 30. After receiving the current position, the terminal device 30 receives a flight control instruction instructing how to fly the autonomous aerial robot 10 and sends the received flight control instruction to the autonomous aerial robot 10. The movement control unit 115 causes the autonomous aerial robot 10 to fly in accordance with the received flight control instruction.

If the distance of the movement path generated by the movement path generating unit 114 is longer than a predetermined distance, the communication unit 104 may send the distance of the generated movement path to the terminal device 30. Note that the terminal device 30 is carried by an observer who monitors the autonomous aerial robot 10, a manager who manages the autonomous aerial robot 10, or an owner who owns the autonomous aerial robot 10. For example, if a path that leads through the outside of the visible range is generated, the distance between the start point and the destination point may be very long and, thus, a battery may not last the entire distance to the destination point. Accordingly, if the distance of the movement path generated by the movement path generating unit 114 is longer than the predetermined distance, the communication unit 104 sends, to the terminal device 30, the distance of the generated movement path. After receiving the distance, the terminal device 30 receives a flight control instruction on how to fly the autonomous aerial robot 10 and sends the received flight control instruction to the autonomous aerial robot 10. The movement control unit 115 causes the autonomous aerial robot 10 to fly in accordance with the received flight control instruction.

A method for generating a movement path according to a modification of the first exemplary embodiment is described below. According to the above-described first exemplary embodiment, the visible range is defined in a two-dimensional plane, and a movement path along which the autonomous aerial robot 10 moves is generated in the two-dimensional plane. In contrast, according to the modification of the first exemplary embodiment, the visible range is defined in three-dimensional space, and a movement path along which the autonomous aerial robot 10 moves is generated in the three-dimensional space. The visible range is changed in accordance with the type of information regarding the person present around the autonomous aerial robot 10. That is, the visible range calculation unit 112 calculates a first visible range defined in accordance with the current position of the person, calculates a second visible range defined in accordance with the direction of the body of the person, calculates a third visible range defined in accordance with the direction of the face of the person, and calculates a fourth visible range defined in accordance with the direction of the line of sight of the person.

Figure 7:
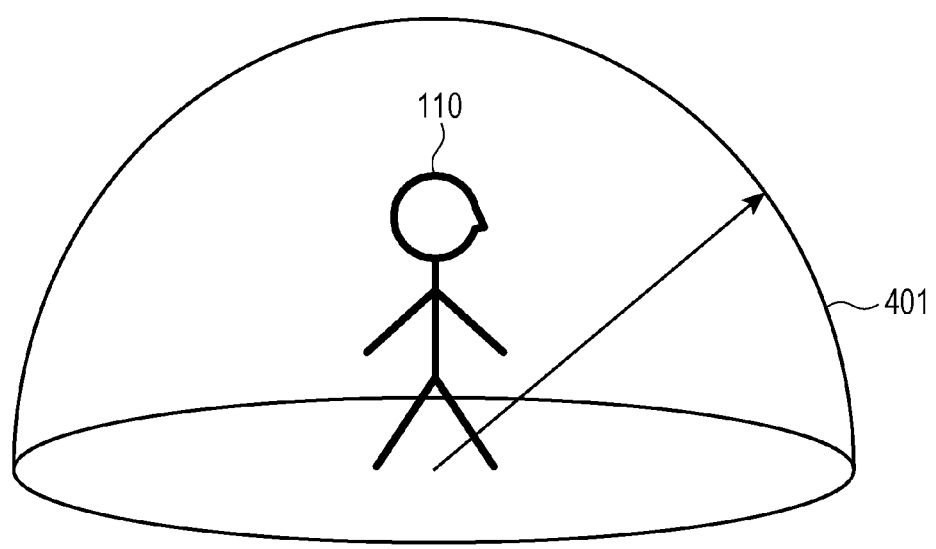
FIG. 7 is a perspective view of an example of a first visible range according to a modification of the first exemplary embodiment.
Figure 9B:
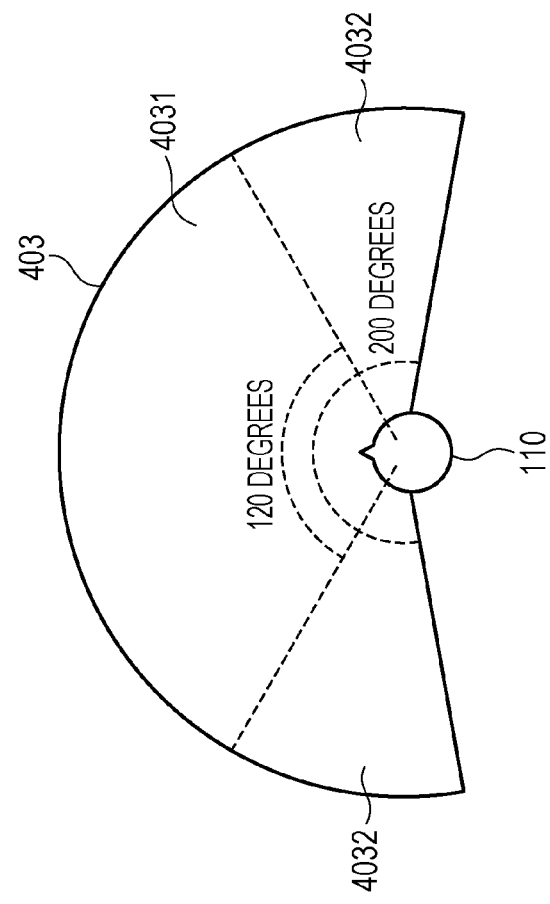
FIGS. 9A and 9B illustrate an example of a third visible range according to the modification of the first exemplary embodiment.
Figure 9A:
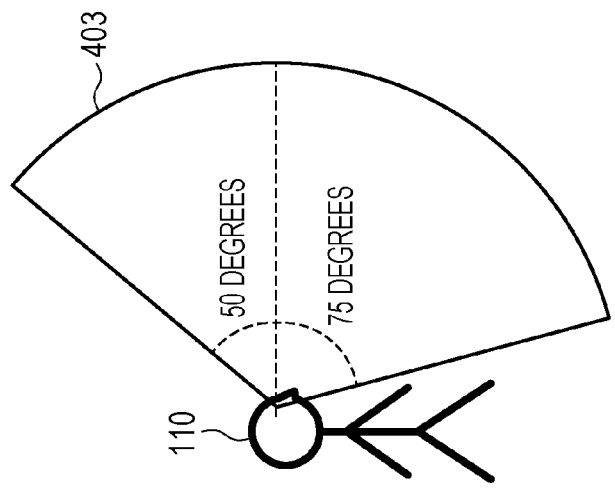
Figure 10B:
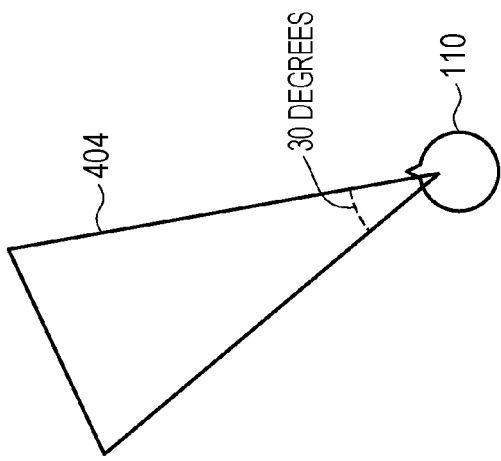
FIGS. 10A and 10B illustrate an example of a fourth visible range according to the modification of the first exemplary embodiment.
Figure 10A:
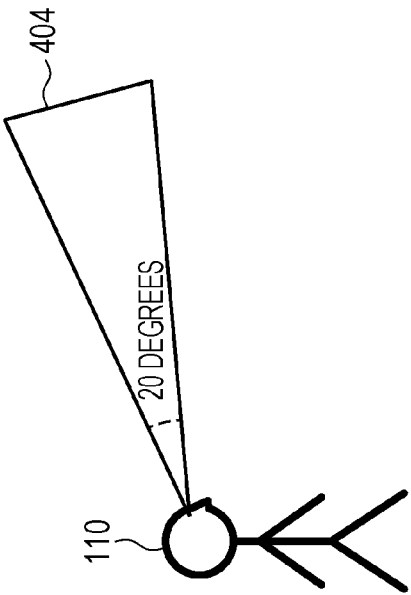

FIG. 7 is a perspective view of an example of the first visible range according to the modification of the first exemplary embodiment. FIGS. 8A and 8B illustrate an example of the second visible range according to the modification of the first exemplary embodiment. More specifically, FIG. 8A is a side view of the example of the second visible range according to the modification of the first exemplary embodiment, and FIG. 8B is a top view of the example of the second visible range according to the modification of the first exemplary embodiment. FIGS. 9A and 9B illustrate an example of the third visible range according to the modification of the first exemplary embodiment. More specifically, FIG. 9A is a side view of the example of the third visible range according to the modification of the first exemplary embodiment, and FIG. 9B is a top view of the example of the third visible range according to the modification of the first exemplary embodiment. FIGS. 10A and 10B illustrate an example of the fourth visible range according to the modification of the first exemplary embodiment. More specifically, FIG. 10A is a side view of the example of the fourth visible range according to the modification of the first exemplary embodiment, and FIG. 10B is a top view of the example of the fourth visible range according to the modification of the first exemplary embodiment.

A first visible range 401 illustrated in FIG. 7 is calculated when the current position of the person 110 is acquired. The first visible range 401 is defined as a hemisphere with a predetermined radius, the center of which coincides with the current position of the person 110.

A second visible range 402 illustrated in FIGS. 8A and 8B is calculated when the direction of the body of the person 110 is acquired. The second visible range 402 is defined as a solid formed by cutting out, from a hemisphere with a predetermined radius, the center of which coincides with the current position of the person 110, a wedge on the back side of the person 110. The angle of the wedge is 60 degrees.

A third visible range 403 illustrated in FIGS. 9A and 9B is calculated when the direction of the face of the person 110 is acquired. The third visible range 403 is formed in a direction in which the face of the person 110 is pointing. The third visible range 403 is defined as a solid formed by rotating a fan having a center angle of 200 degrees in a horizontal plane about the position of the face of the person 110 by 50 degrees in the upward direction and rotating the fan in a horizontal plane by 75 degrees in the downward direction. Note that the third visible range 403 includes a binocular vision range 4031 formed by rotating a fan having a center angle of 120 degrees in the horizontal plane in the upward and downward directions and peripheral vision ranges 4032 formed on the right and left sides of the binocular vision range 4031, each by rotating a fan having a center angle of 40 degrees in the horizontal plane in the upward and downward directions.

A fourth visible range 404 illustrated in FIGS. 10A and 10B is calculated when the direction of the line of sight of the person 110 is acquired. The fourth visible range 404 is formed in a direction of the line of sight of the person 110. The fourth visible range 404 is defined as a four-sided pyramid having an apex that coincides with the position of the eye of the person 110. The angle formed by two sides in a horizontal plane is 30 degrees, and the angle formed by two sides in a vertical plane is 20 degrees.

Figure 11:
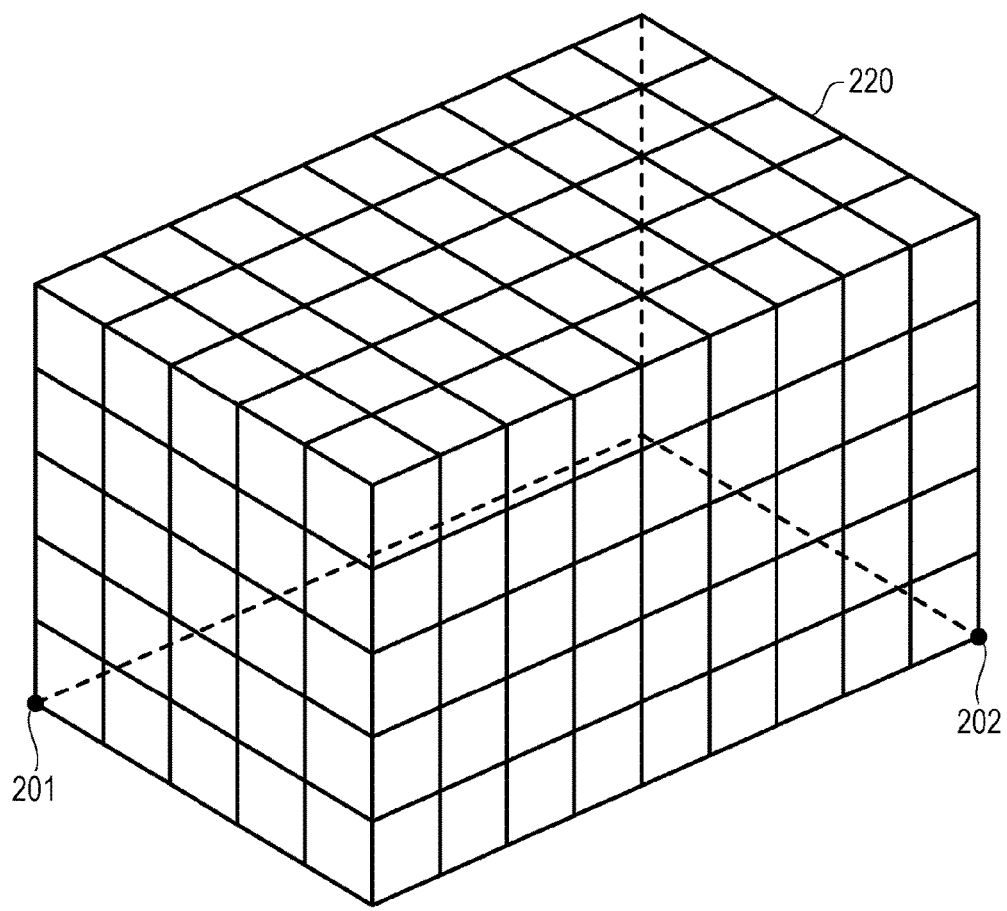
FIG. 11 is a schematic illustration of a method for generating a movement path according to the modification of the first exemplary embodiment.

FIG. 11 is a schematic illustration of a method for generating a movement path according to the modification of the first exemplary embodiment. As illustrated in FIG. 11, the movement path generating unit 114 divides three-dimensional space 220 including the start point 201 and the destination point 202 of the autonomous aerial robot 10 into a regular grid of cubes. Thus, the three-dimensional space 220 is formed from a plurality of cubes. Note that the length of the three-dimensional space 220 in each of the X-axis direction and the Y-axis direction may be determined in accordance with the start point and the destination point. The length of the three-dimensional space 220 in the Z-axis direction (the altitude) may be determined in accordance with the available flight level of the autonomous aerial robot 10. In addition, if the movement path generating unit 114 cannot generate a movement path, the movement path generating unit 114 may enlarge the three-dimensional space 220 and generate a movement path again.

The movement path generating unit 114 assigns a cost value to each of the edges of the cubes obtained through the dividing operation on the basis of at least one of the first visible range 401 defined in accordance with the current position of the person, the second visible range 402 defined in accordance with the direction of the body of the person, the third visible range 403 defined in accordance with the direction of the face of the person, and the fourth visible range 404 defined in accordance with the direction of the line of sight of the person.

That is, if only the current position of the person is acquired, the movement path generating unit 114 superimposes the first visible range 401 defined in accordance with the current position of the person on the three-dimensional space 220. The movement path generating unit 114 assigns, to each of the edges of the cubes at least part of which is located in the first visible range 401 in the three-dimensional space 220, a cost value calculated in accordance with the distance between the edge and the current position of the person. At that time, the cost value can be calculated by dividing a predetermined constant $\alpha$ by the distance between the edge and the current position of the person. Accordingly, the cost value decreases with increasing distance from the person. In addition, the movement path generating unit 114 assigns a cost value of "0" to each of all the edges of the cubes any part of which is not located in the first visible range 401 in the three-dimensional space 220. The movement path generating unit 114 generates a movement path by selecting, from among all the paths that start from the start point 201 and end at the destination point 202 via the edges of the cubes, the path having the lowest total cost and the shortest distance between the start point 201 and the destination point 202.

In addition, if the current position of the person and the direction of the body of the person are acquired, the movement path generating unit 114 superimposes the first visible range 401 defined in accordance with the current position of the person and the second visible range 402 defined in accordance with the direction of the body of the person on the three-dimensional space 220. The movement path generating unit 114 assigns, to each of the edges of the cubes part of which is located in the first visible range 401 in the three-dimensional space 220, a first cost value calculated in accordance with the distance between the edge and the current position of the person and assigns, to each of all the edges part of which is located in the second visible range 402 in the three-dimensional space 220, a second cost value calculated in accordance with the distance between the edge and the current position of the person. At that time, each of the first and second cost values is calculated by dividing a predetermined constant α by the distance between the edge and the current position of the person.

Subsequently, the movement path generating unit 114 sums the first cost value and a value obtained by multiplying the second cost value by a predetermined weight for each of the edges of the cubes part of which is located in the first visible range 401 and part of which is located in the second visible range 402 in the three-dimensional space 220. In addition, the movement path generating unit 114 assigns a cost value of "0" to each of all the edges of the cubes part of which is not located in the first visible range 401 in the three-dimensional space 220. The movement path generating unit 114 generates a movement path by selecting, from among all the paths that start from the start point 201 and end at the destination point 202 via the edges of the cubes, the path having the lowest total cost and the shortest distance between the start point 201 and the destination point 202.

In addition, if the current position of the person, the direction of the body of the person, and the direction of the face of the person are obtained, the movement path generating unit 114 superimposes the first visible range 401 defined in accordance with the current position of the person, the second visible range 402 defined in accordance with the direction of the body of the person, and the third visible range 403 defined in accordance with the direction of the face of the person on the three-dimensional space 220. The movement path generating unit 114 assigns, to each of the edges of the cubes part of which is located in the first visible range 401 in the three-dimensional space 220, a first cost value calculated in accordance with the distance between the edge and the current position of the person, assigns, to each of the edges of the cubes part of which is located in the second visible range 402 in the three-dimensional space 220, a second cost value calculated in accordance with the distance between the edge and the current position of the person, and assigns, to each of the edges of the cubes part of which is located in the third visible range 403 in the three-dimensional space 220, a third cost value calculated in accordance with the distance between the edge and the position of the face of the person. At that time, each of the first, second, and third cost values is calculated by dividing a predetermined constant α by the distance between the edge and the current position of the person.

Subsequently, the movement path generating unit 114 sums the first cost value and a value obtained by multiplying the second cost value by a first weight value for each of the edges of the cubes part of which is located in the first visible range 401 and the second visible range 402 in the three-dimensional space 220. In addition, the movement path generating unit 114 sums the first cost value, a value obtained by multiplying the second cost value by the first weight value, and a value obtained by multiplying the third cost value by a second weight value which is greater than the first weight value for each of all the edges of the cubes part of which is located in the first visible range 401, the second visible range 402, and the third visible range 403 in the three-dimensional space 220.

Note that the weight values multiplied by the third cost value for the binocular vision range 4031 and the peripheral vision range 4032 included in the third visible range 403 may differ from each other. That is, the weight value for the binocular vision range 4031 may be greater than that for the peripheral vision ranges 4032. In addition, the movement path generating unit 114 assigns a value of "0" to each of all the edges of the cubes part of which is not in the first visible range 401 in the three-dimensional space 220. The movement path generating unit 114 generates a movement path by selecting, from among all the paths that start from the start point 201 and end at the destination point 202 via the edges of the cubes, the path having the lowest total cost and the shortest distance between the start point 201 and the destination point 202.

Furthermore, if the current position of the person, the direction of the body of the person, the direction of the face of the person, and the direction of the line of sight of the person are obtained, the movement path generating unit 114 superimposes the first visible range 401 defined in accordance with the current position of the person, the second visible range 402 defined in accordance with the direction of the body of the person, the third visible range 403 defined in accordance with the direction of the face of the person, and the fourth visible range 404 defined in accordance with the direction of the line of sight of the person on the three-dimensional space 220. The movement path generating unit 114 assigns, to each of the edges of the cubes part of which is located in the first visible range 401 in the three-dimensional space 220, a first cost value calculated in accordance with the distance between the edge and the current position of the person, assigns, to each of all the edges part of which is located in the second visible range 402 in the three-dimensional space 220, a second cost value calculated in accordance with the distance between the edge and the current position of the person, assigns, to each of the edges of the cubes part of which is located in the third visible range 403 in the three-dimensional space 220, a third cost value calculated in accordance with the distance between the edge and the position of the face of the person, and assigns, to each of the edges of the cubes part of which is located in the fourth visible range 404 in the three-dimensional space 220, a fourth cost value calculated in accordance with the distance between the edge and the position of the face of the person. At that time, each of the first, second, third, and fourth cost values is calculated by dividing a predetermined constant α by the distance between the edge and the current position of the person.

Subsequently, the movement path generating unit 114 sums the first cost value and a value obtained by multiplying the second cost value by a first weight value for each of the edges of the cubes part of which is located in the first visible range 401 and the second visible range 402 in the three-dimensional space 220. In addition, the movement path generating unit 114 sums the first cost value, a value obtained by multiplying the second cost value by the first weight value, and a value obtained by multiplying the third cost value by a second weight value which is greater than the first weight value for each of all the edges of the cubes part of which is located in the first visible range 401, the second visible range 402, and the third visible range 403 in the three-dimensional space 220. Furthermore, the movement path generating unit 114 sums the first cost value, a value obtained by multiplying the second cost value by the first weight value, a value obtained by multiplying the third cost value by a second weight value which is greater than the first weight value, and a value obtained by multiplying the fourth cost value by a third weight value which is greater than the second weight value for each of all the edges of the cubes part of which is located in the first visible range 401, the second visible range 402, the third visible range 403, and the fourth visible range 404 in the three-dimensional space 220. In addition, the movement path generating unit 114 assigns a value of "0" to each of all the edges of the cubes part of which is not in the first visible range 401 in the three-dimensional space 220. The movement path generating unit 114 generates a movement path by selecting, from among all the paths that start from the start point 201 and end at the destination point 202 via the edges of the cubes, the path having the lowest total cost and the shortest distance between the start point 201 and the destination point 202.

As described above, according to the modification of the first exemplary embodiment, since a movement path through which the autonomous aerial robot 10 moves is generated in three-dimensional space, the movement path of the autonomous aerial robot 10 that is invisible to a person can be more accurately generated.

Second Exemplary Embodiment

In the first exemplary embodiment, the outside of the visible range is determined as the movement range in which an autonomous aerial robot moves. In contrast, according to a second exemplary embodiment, the inside of the visible range of a person is determined as the movement range in which the autonomous aerial robot is movable.

Figure 12:
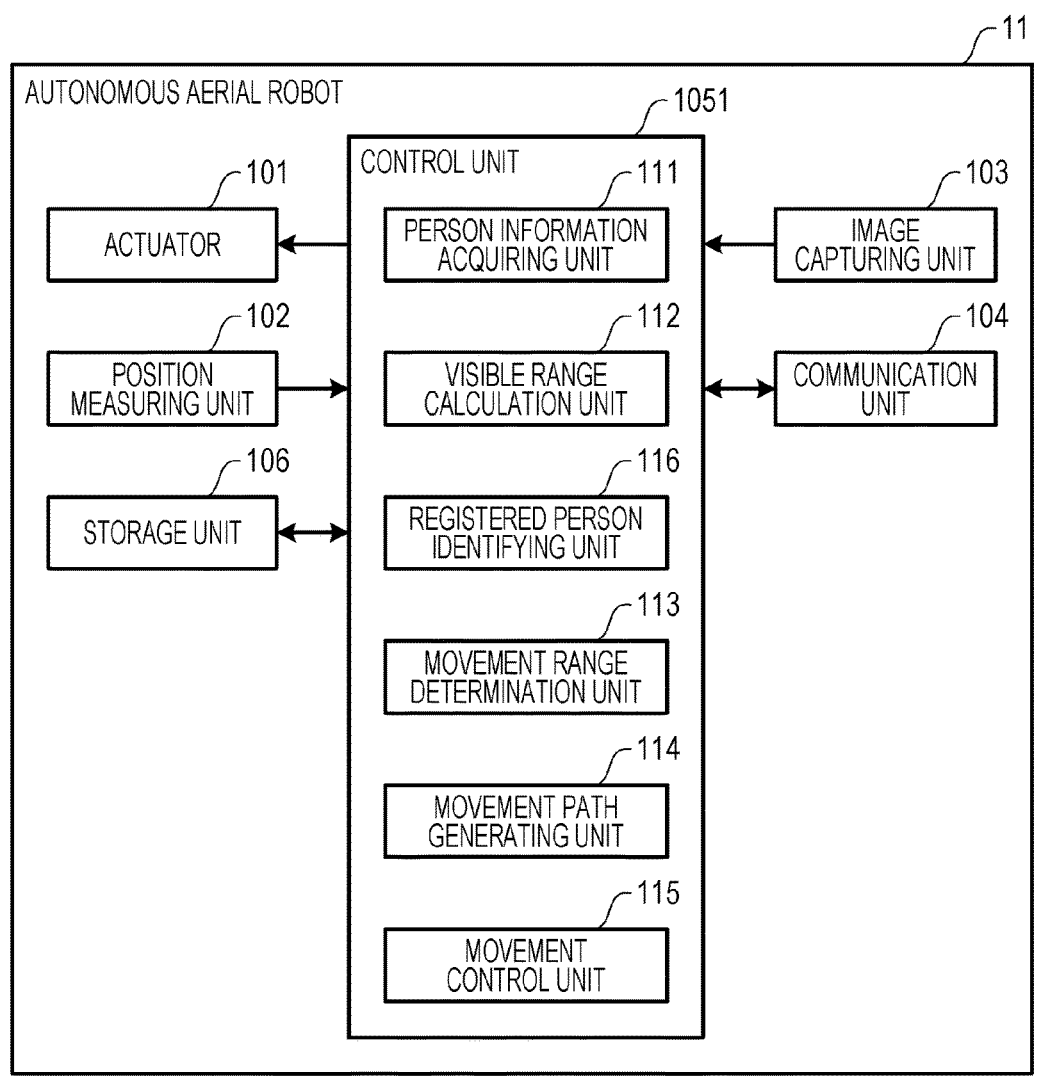
FIG. 12 is a block diagram of the configuration of an autonomous aerial robot according to a second exemplary embodiment of the present disclosure.

FIG. 12 is a block diagram of the configuration of an autonomous aerial robot according to the second exemplary embodiment of the present disclosure. Note that since the configuration of a flight control system according to the second exemplary embodiment is the same as that illustrated in FIG. 1, description of the configuration of the flight control system is not repeated.

As illustrated in FIG. 12, an autonomous aerial robot 11 includes an actuator 101, a position measuring unit 102, an image capturing unit 103, a communication unit 104, a control unit 1051, and a storage unit 106. Note that in the second exemplary embodiment, the configuration same as that of the first exemplary embodiment is identified with the same reference numeral, and description of the configuration is not repeated.

The storage unit 106 prestores the identification information used to identify a predetermined person. The identification information is input using the terminal device 30 and is sent to the autonomous aerial robot 11. The communication unit 104 receives the identification information sent from the terminal device 30 and stores the received identification information in the storage unit 106. In this way, the terminal device 30 registers the identification information in the storage unit 106 of the autonomous aerial robot 11. Note that the identification information is a face image of a predetermined person. The predetermined person is, for example, an observer who monitors the autonomous aerial robot 10, a manager who manages the autonomous aerial robot 10, or an owner who owns the autonomous aerial robot 10. Note that instead of storing the identification information corresponding to one person, the storage unit 106 may store the identification information corresponding to a plurality of persons.

The control unit 1051 is, for example, a CPU. The control unit 1051 controls the operation performed by the autonomous aerial robot 11. The control unit 1051 includes a person information acquiring unit 111, a visible range calculation unit 112, a movement range determination unit 113, a movement path generating unit 114, a movement control unit 115, and a registered person identifying unit 116. The autonomous aerial robot 11 includes a memory (not illustrated), which stores a program that allows the control unit 1051 to function. When the CPU executes the program, the control unit 1051 functions. Alternatively, the control unit 1051 may be formed using a dedicated circuit having the function of the control unit 1051. The dedicated circuit may be, for example, an integrated circuit.

The registered person identifying unit 116 determines whether the person present around the autonomous aerial robot 11 is the predetermined person on the basis of the identification information registered in the storage unit 106. That is, the registered person identifying unit 116 compares the face image of the person included in the image information with the face image pre-registered in the storage unit 106. If the persons of the two face images are the same, the registered person identifying unit 116 determines that the person present around the autonomous aerial robot 11 is the predetermined person.

If it is determined that the person present around the autonomous aerial robot 11 is the predetermined person, the movement range determination unit 113 determines that the inside of the visible range of the predetermined person present around the autonomous aerial robot 11 is the movement range.

The movement path generating unit 114 generates a movement path along which the autonomous aerial robot 11 moves in the movement range determined by the movable range determination unit 113. According to the second exemplary embodiment, the movement path generating unit 114 generates the movement path along which the autonomous aerial robot 11 moves within the visible range in which the autonomous mobile robot 11 is visible to the eyes of the predetermined person present around the autonomous aerial robot 11.

A method for calculating the visible range and a method for generating the movement path according to the second exemplary embodiment are the same as those according to the first exemplary embodiment. Note that the movement path generating unit 114 generates the movement path 204 by selecting, from among all the paths that start from the start point 201 and end at the destination point 202 via the sides of the grids, the path having the highest total cost and the shortest distance between the start point 201 and the destination point 202.

According to the second exemplary embodiment, the identification information may be sent from a communication device carried by the predetermined person. In such a case, the communication device is, for example, a device that transmits the identification information using infrared light or a radio wave. The communication unit 104 receives the identification information transmitted by the communication device. The registered person identifying unit 116 determines whether the person present around the autonomous aerial robot 11 is the predetermined person on the basis of the identification information registered in the storage unit 106. That is, the registered person identifying unit 116 compares the identification information received by the communication unit 104 with the identification information registered in the storage unit 106. If the two pieces of identification information are the same, the registered person identifying unit 116 determines that the person present around the autonomous aerial robot 11 is the predetermined person.

As described above, since the inside of the visible range of a predetermined person having pre-registered identification information is determined as the movement range, the predetermined person can monitor the autonomous aerial robot 11 moving within the visible range at all times.

Third Exemplary Embodiment

According to the first and second exemplary embodiments, the movement path is generated by the autonomous aerial robots 10 or 11. In contrast, according to the third exemplary embodiment, the movement path is generated by a server connected to an autonomous aerial robot via a network.

Figure 13:
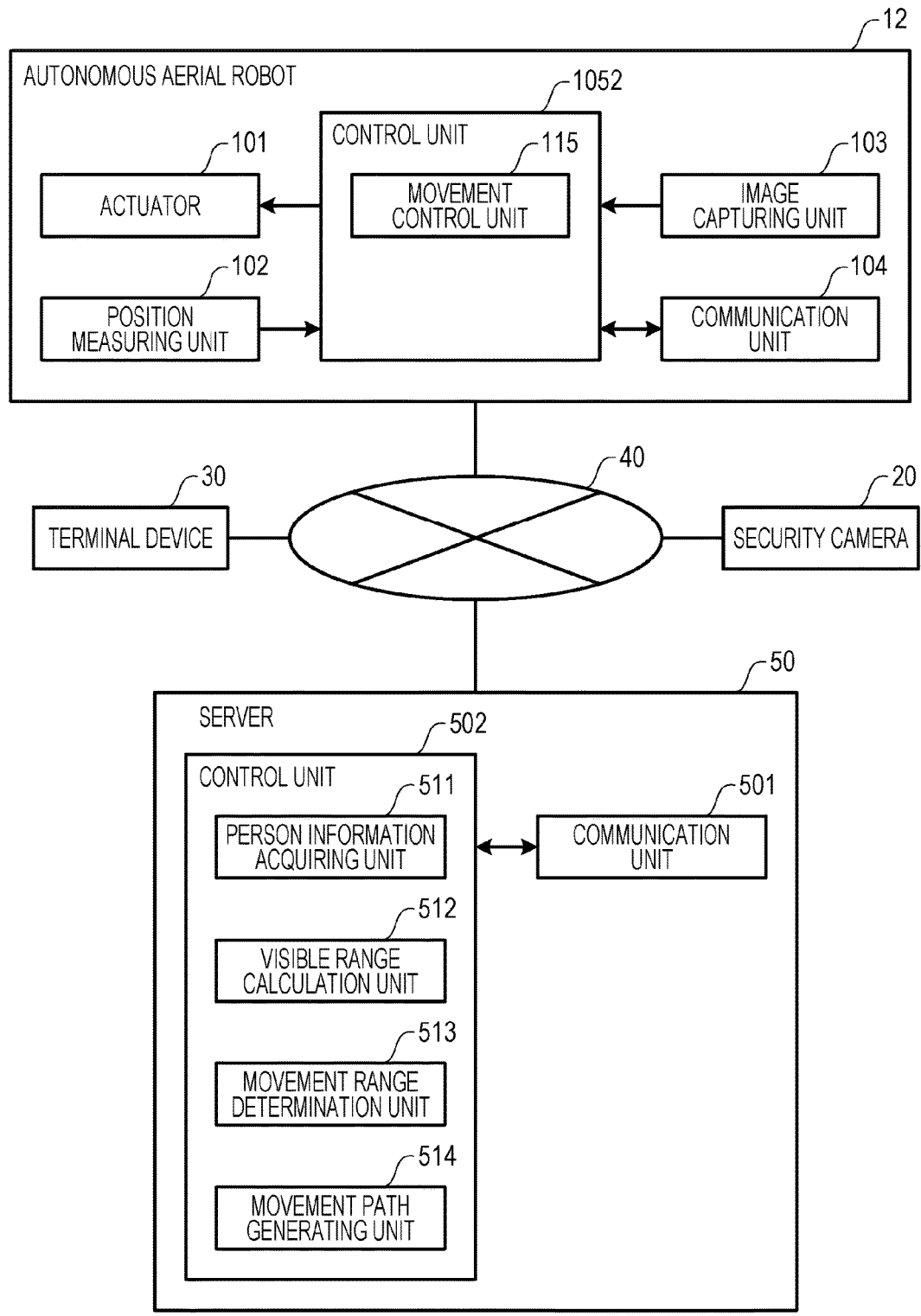
FIG. 13 is a block diagram of the configuration of a flight control system according to a third exemplary embodiment of the present disclosure.

FIG. 13 is a block diagram of the configuration of a flight control system according to the third exemplary embodiment of the present disclosure. Note that in the third exemplary embodiment, the configuration the same as that of the first and second exemplary embodiments is identified with the same reference numeral, and description of the configuration is not repeated.

As illustrated in FIG. 13, the flight control system includes an autonomous aerial robot 12, a security camera 20, a terminal device 30, and a server 50.

The autonomous aerial robot 12 includes an actuator 101, a position measuring unit 102, an image capturing unit 103, a communication unit 104, and a control unit 1052. The control unit 1052 includes a movement control unit 115. The autonomous aerial robot 12 includes a memory (not illustrated), which stores a program that allows the control unit 1052 to function. When the CPU executes the program, the control unit 1052 functions. Alternatively, the control unit 1052 may be formed using a dedicated circuit having the function of the control unit 1052. The dedicated circuit may be, for example, an integrated circuit.

The communication unit 104 sends, to the server 50, image information regarding the image of the person present around the autonomous aerial robot 12, captured by the image acquiring unit 103. In addition, the communication unit 104 receives movement path information sent from the server 50.

The movement control unit 115 controls the movement of the autonomous aerial robot 12 in accordance with the movement path indicated by the movement path information received by the communication unit 104.

The server 50 is connected to the autonomous aerial robot 12, the security camera 20, and the terminal device 30 via the network 40 so as to communicate with the autonomous aerial robot 12, the security camera 20, and the terminal device 30. The server 50 includes a communication unit 501 and a control unit 502.

The communication unit 501 receives the image information from the security camera 20 via the network 40. In addition, the communication unit 104 receives the image information from the autonomous aerial robot 12 via the network 40. Furthermore, the communication unit 104 receives information indicating the start point and the destination point from the terminal device 30 via the network 40. Still furthermore, the communication unit 104 receives, from the terminal device 30, the environment information indicating the map of the area around the autonomous aerial robot 12 identified by the position information indicating the current position of the autonomous aerial robot 12.

The control unit 502 is, for example, a CPU. The control unit 502 generates a movement path along which the autonomous aerial robot 12 moves. The control unit 502 includes a person information acquiring unit 511, a visible range calculation unit 512, a movement range determination unit 513, and a movement path generating unit 514. The server 50 may include a memory (not illustrated), which may store a program that allows the control unit 502 to function. When the CPU executes the program, the control unit 502 functions. Alternatively, the control unit 502 may be formed using a dedicated circuit having the function of the control unit 502. The dedicated circuit may be, for example, an integrated circuit.

Note that the functions of the person information acquiring unit 511, the visible range calculation unit 512, the movement range determination unit 513, and the movement path generating unit 514 according to the third exemplary embodiment are the same as the functions of the person information acquiring unit 111, the visible range calculation unit 112, the movable range determination unit 113, and the movement path generating unit 114 according to the first exemplary embodiment, respectively. According to the third exemplary embodiment, a movement path is generated in the same manner as in the first exemplary embodiment.

The communication unit 104 sends, to the autonomous aerial robot 12, movement path information indicating the movement path generated by the movement path generating unit 114.

Since the movement path is generated in the server 50 in this manner, the load of calculation imposed on the autonomous aerial robot 12 can be reduced.

In addition, while the third exemplary embodiment has been described with reference to the server 50 that generates the movement path, the present disclosure is not limited thereto. The terminal device 30 may generate the movement path. Alternatively, a remote controller used to control the autonomous aerial robot 12 may generate the movement path.

Note that according to the first to third exemplary embodiments, the autonomous aerial robot is an example of the autonomous mobile robot. However, according to the present disclosure, the autonomous mobile robot is not limited to an autonomous aerial robot. The configuration of the autonomous aerial robot is applicable to autonomous traveling robots (driverless vehicles) that travel on the ground and cleaning robots that autonomously perform a cleaning operation. Note that the space in which the autonomous mobile robot moves may be either indoor or outdoor.

Some of the constituent elements of the autonomous mobile robot or the server according to the above-described present exemplary embodiments may be configured as, for example, a single system LSI (Large Scale Integration). For example, at least one of the communication unit 104 and the control unit 105 of the autonomous aerial robot 10 may be configured as a system LSI.

In addition, for example, at least one of the communication unit 104 and the control unit 1051 of the autonomous aerial robot 11 may be configured as a system LSI.

Furthermore, for example, at least one of the communication unit 104 and the control unit 1052 of the autonomous aerial robot 12 may be configured as a system LSI.

Still furthermore, for example, at least one of the communication unit 501 and the control unit 502 of the server 50 may be configured as a system LSI.

A system LSI is a super multifunctional LSI produced by integrating a plurality of constituent units into one chip. More specifically, the system LSI is a computer system including a microprocessor, a read only memory (ROM), and a random access memory (RAM). The ROM stores a computer program. The microprocessor operates in accordance with the computer program and, thus, the system LSI realizes the function.

Note that the term "LSI" is used herein, but the terms "IC," "system LSI," "super LSI" or "ultra LSI" may he used as well depending on the level of integration. In addition, the circuit integration is not limited to LSI and may be achieved by dedicated circuitry or a general-purpose processor other than an LSI. Alternatively, a field programmable gate array (FPGA), which is programmable after fabrication of LSI, or a reconfigurable processor which allows reconfiguration of connections and settings of circuit cells in LSI after fabrication of LSI may be used.

Moreover, should a circuit integration technology replacing LSI appear as a result of advancements in semiconductor technology or other technologies derived flout the technology, the functional blocks could be integrated using such a technology. Another possibility is the application of biotechnology, for example.

The movement control method, the autonomous mobile robot, and the program according to the present disclosure allow a person present around the autonomous mobile robot to monitor the autonomous mobile robot at all times by causing the autonomous mobile robot to move within the visible range of the person or allow the autonomous mobile robot to be invisible to a person present around the autonomous mobile robot by causing the autonomous mobile robot to move outside the visible range of the person. Thus, the movement control method, the autonomous mobile robot, and the program according to the present disclosure are effective as a method for controlling the movement of an autonomous mobile robot, an autonomous mobile robot that autonomously moves, and a recording medium that records a movement control program for controlling the movement of the autonomous mobile robot.

What is claimed is:

1. A method for controlling movement of an autonomous mobile robot comprising:
    acquiring information regarding a person present around the autonomous mobile robot, the acquired information regarding the person being sensed by a sensor detecting any of a position of the person, a direction of a body of the person, a direction of a face of the person, and a direction of a line of sight of the person;
    calculating a predetermined visible range in which the autonomous mobile robot is visible to the eyes of the person on the basis of the any of the position of the person, the direction of the body of the person, the direction of the face of the person, and the direction of the line of sight of the person;
    determining a movement range in which the autonomous mobile robot moves, wherein the movement range is a range only outside of the calculated predetermined visible range, and
    causing the autonomous mobile robot to move within the determined movement range.

2. The method according to claim 1, wherein a movement path along which the autonomous mobile robot moves is generated within the determined movement range.

3. The method according to claim 2, wherein the predetermined visible range has different cost values each determined in accordance with the information regarding the person, and
    wherein the autonomous mobile robot superimposes the predetermined visible range on a map including a start point and a destination point of the autonomous mobile robot and generates the movement path using an optimization algorithm.

4. The method according to claim 2, wherein the predetermined visible range includes a first range formed in immediately front of the person, a second range formed in immediately back of a body of the person, and a third range formed on an outer side of the first range and the second range,
    wherein the predetermined visible range is superimposed on a map including a start point and a destination point of the autonomous mobile robot, and the map is divided into a grid of squares so that each of the start point and the destination point coincides with an intersection point of sides of a square,
    wherein among all the sides of the squares, a cost value having a first value is assigned to each of the sides at least part of which is located in the first range, a cost value having a second value that is less than the first value is assigned to each of the sides part of which is located in the second range and the remaining part of which is not located in the first range or each of the sides the entirety of which is located in the second range, a cost value having a third value that is less than the second value is assigned to each of the sides part of which is located in the third range and the remaining part of which is not located in the first range and the second range or each of the sides the entirety of which is located in the third range, and a cost value having a fourth value that is less than the third value is assigned to each of the sides the entirety of which is located in none of the first range, the second range, and the third range, and
    wherein a movement path is generated by selecting, from among all the paths that start from the start point and end at the destination point via the sides of the squares, the path having the lowest total cost and the shortest distance between the start point and the destination point.

5. The method according to claim 2, wherein if a length of the generated movement path is longer than a predetermined distance, the length of the generated movement path is sent to a predetermined terminal device.

6. The method according to claim 1, wherein identification information for identifying a predetermined person is registered in advance, it is determined whether the person present around the autonomous mobile robot is the predetermined person on the basis of the registered identification information.

7. The method according to claim 6, wherein the identification information is a face image of the predetermined person.

8. The method according to claim 6, wherein the identification information is sent from a communication device carried by the predetermined person.

9. The method according to claim 1, wherein the predetermined visible range is a region in a two-dimensional plane determined in accordance with at least one of the position of the person, the direction of the body of the person, the direction of the face of the person, and the direction of the line of sight of the person.

10. The method according to claim 1, wherein the autonomous mobile robot includes an image capturer that acquires an image of an area around the autonomous mobile robot, and wherein the information regarding the person is acquired from information regarding the image acquired by the image capturer.

11. The method according to claim 1, wherein the information regarding the person is acquired from image information acquired by an image capturer installed around the autonomous mobile robot.

12. The method according to claim 1, wherein the position of the person is acquired by a position sensor carried by the person.

13. The method according to claim 1, wherein the direction in which the person faces is acquired by a geomagnetic sensor carried by the person.

14. The method according to claim 1, wherein the information regarding the person is acquired from information regarding an image around a second autonomous mobile robot other than the autonomous mobile robot, and the image information is acquired by an image capturer provided in the second autonomous mobile robot.

15. The method according to claim 1, wherein information regarding an obstacle present around the autonomous mobile robot is acquired, and wherein the movement range is determined on the basis of the acquired information regarding the obstacle and the calculated predetermined visible range.

16. The method according to claim 1, wherein the autonomous mobile robot is an autonomous aerial robot, and wherein an altitude at which the autonomous aerial robot flies is acquired, and the movement range is determined only when the acquired altitude is lower than a predetermined altitude.

17. The method according to claim 1, wherein if the movement range is not determined, a current position of the autonomous mobile robot is sent to a predetermined terminal device.

18. The method according to claim 1, wherein at least one of the acquisition of the information regarding the person, the calculation of the predetermined visible range, the determination of the movement range and the causing is performed by a processor.

19. An autonomous mobile robot for performing autonomous movement, comprising:

a processor, and a memory that stores a program which, when executed by the processor, causes the processor to execute:

acquiring information regarding a person present around the autonomous mobile robot, the acquired information regarding the person being sensed by a sensor detecting any of a position of the person, a direction of a body of the person, a direction of a face of the person, and a direction of a line of sight of the person;

calculating a predetermined visible range in which the autonomous mobile robot is visible to the eyes of the person on the basis of the any of the position of the person, the direction of the body of the person, the direction of the face of the person, and the direction of the line of sight of the person;

determining a movement range in which the autonomous mobile robot moves, wherein the movement range is a range only outside of the calculated predetermined visible range; and causing the autonomous mobile robot to move within the determined movement range.

20. A non-transitory recording medium storing a computer-readable program that controls movement of an autonomous mobile robot by causing a computer to execute:

acquiring information regarding a person present around the autonomous mobile robot, the acquired information regarding the person being sensed by a sensor detecting any of a position of the person, a direction of a body of the person, a direction of a face of the person, and a direction of a line of sight of the person;

calculating a predetermined visible range in which the autonomous mobile robot is visible to the eyes of the person on the basis of the any of the position of the person, the direction of the body of the person, the direction of the face of the person, and the direction of the line of sight of the person;

determining a movement range in which the autonomous mobile robot moves, wherein the movement range is a range only outside of the calculated predetermined visible range; and causing the autonomous mobile robot to move within the determined movement range.

* * * * *